United States Patent
Fujisawa et al.

(10) Patent No.: US 11,934,611 B2
(45) Date of Patent: Mar. 19, 2024

(54) DETECTING DEVICE WITH MULTIPLEXER AND DISPLAY DEVICE

(71) Applicant: Japan Display Inc., Tokyo (JP)

(72) Inventors: Akihiko Fujisawa, Tokyo (JP); Naoki Takada, Tokyo (JP); Kisho Yamamoto, Tokyo (JP)

(73) Assignee: Japan Display Inc., Tokyo (JP)

(*) Notice: Subject to any disclaimer, the term of this patent is extended or adjusted under 35 U.S.C. 154(b) by 135 days.

(21) Appl. No.: 17/684,627

(22) Filed: Mar. 2, 2022

(65) Prior Publication Data

US 2022/0187975 A1 Jun. 16, 2022

Related U.S. Application Data

(63) Continuation of application No. PCT/JP2020/027571, filed on Jul. 15, 2020.

(30) Foreign Application Priority Data

Sep. 4, 2019 (JP) ................................. 2019-161437

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ............................ G06F 3/04166; G06F 3/0446
See application file for complete search history.

(56) References Cited

U.S. PATENT DOCUMENTS

| | | |
|---|---|---|
| 2013/0141363 A1 | 6/2013 | Hung et al. |
| 2013/0342801 A1 | 12/2013 | Hamada et al. |
| 2015/0062075 A1 | 3/2015 | Wakuda |
| 2017/0031523 A1 | 2/2017 | Seo et al. |
| 2017/0242524 A1* | 8/2017 | Kim .................... G06F 3/04166 |
| 2019/0146610 A1 | 5/2019 | Teranishi |

FOREIGN PATENT DOCUMENTS

| | | |
|---|---|---|
| CN | 107390910 A | 11/2017 |
| JP | 2015-049771 | 3/2015 |
| JP | 2015-114747 A | 6/2015 |
| JP | 2019-091401 A | 6/2019 |
| WO | WO2012/118038 A1 | 9/2012 |

OTHER PUBLICATIONS

Search Report issued in International Patent Application No. PCT/JP2020/027571 dated Sep. 24, 2020 and English translation of same. 5 pages.
Written Opinion issued in International Patent Application No. PCT/JP2020/027571 dated Sep. 24, 2020. 4 pages.

* cited by examiner

*Primary Examiner* — Lisa S Landis
(74) *Attorney, Agent, or Firm* — K&L Gates LLP

(57) ABSTRACT

A detecting device includes a plurality of first electrodes arrayed in a first direction and a second direction intersecting the first direction in a detection region, an electrode drive circuit configured to supply a drive signal to the first electrodes, a detection circuit configured to detect a detection signal received from the first electrodes, and a coupling circuit configured to couple part of the first electrodes to the detection circuit as a detection electrode and couple the first electrodes disposed side by side with the detection electrode in at least the first direction and the second direction to the electrode drive circuit as a drive electrode in a first detection period.

10 Claims, 31 Drawing Sheets

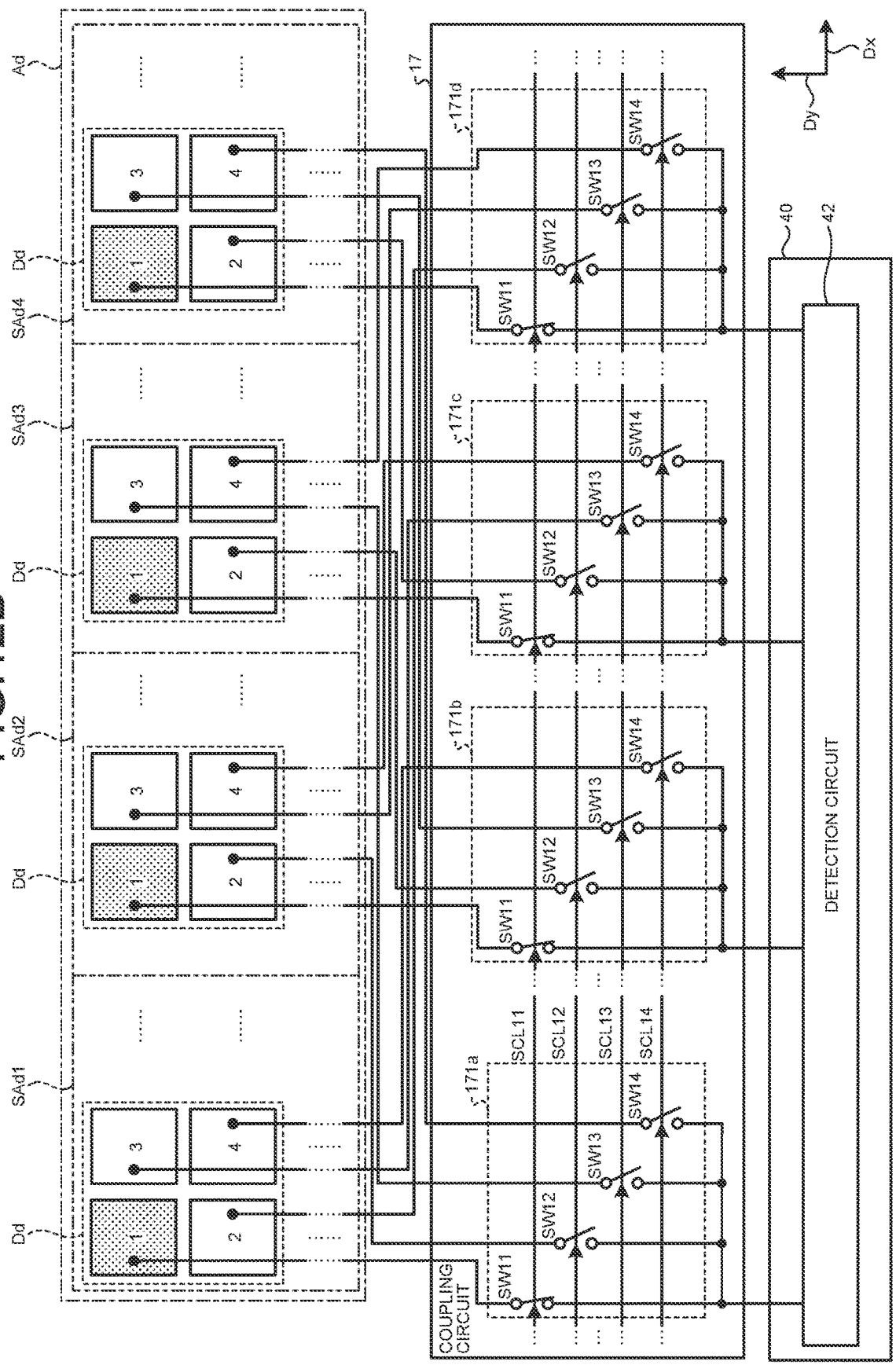

DETECTING DEVICE WITH MULTIPLEXER AND DISPLAY DEVICE

CROSS-REFERENCE TO RELATED APPLICATION

This application is a continuation of International Patent Application No. PCT/JP2020/027571 filed on Jul. 15, 2020 which designates the United States, incorporated herein by reference, and which claims the benefit of priority from Japanese Patent Application No. 2019-161437 filed on Sep. 4, 2019, incorporated herein by reference.

BACKGROUND

1. Technical Field

The present disclosure relates to a detecting device and a display device.

2. Description of the Related Art

Touch detecting devices, what are called touch panels, capable of detecting an external proximity object have recently been attracting attention. Touch panels are mounted on or integrated with a display device, such as a liquid crystal display device, and are used as display devices. Various configurations of touch panels integrated with a display device are known, including a configuration in which drive electrodes for display are disposed in a matrix (row-column configuration) and are also used as drive electrodes for touch detection (e.g., U.S. Unexamined Patent Application Publication No. 2017/0031523).

Self-capacitance touch detection cannot detect that an external proximity object comes closer to a panel. To detect that an external proximity object comes closer to a panel, it is necessarily to perform mutual capacitance touch detection. In the configuration described in U.S. Unexamined Patent Application Publication No. 2017/0031523, the electrodes arrayed in one direction may be used as detection electrodes, and the other electrodes may be used as drive electrodes to perform mutual capacitance touch detection. In this case, however, the signal strength required to perform mutual capacitance touch detection fails to be obtained, thereby reducing the detection sensitivity.

An object of the present disclosure is to provide a detecting device and a display device that has higher detection sensitivity.

SUMMARY

A detecting device according to an embodiment of the present disclosure includes a plurality of first electrodes arrayed in a first direction and a second direction intersecting the first direction in a detection region, an electrode drive circuit configured to supply a drive signal to the first electrodes, a detection circuit configured to detect a detection signal received from the first electrodes, and a coupling circuit configured to couple part of the first electrodes to the detection circuit as a detection electrode and couple the first electrodes disposed side by side with the detection electrode in at least the first direction and the second direction to the electrode drive circuit as a drive electrode in a first detection period.

A display device according to an embodiment of the present disclosure includes a detecting device including a plurality of first electrodes arrayed in a first direction and a second direction intersecting the first direction in a detection region, an electrode drive circuit configured to supply a drive signal to the first electrodes, a detection circuit configured to detect a detection signal received from the first electrodes, and a coupling circuit configured to couple part of the first electrodes to the detection circuit as a detection electrode and couple the first electrodes disposed side by side with the detection electrode in at least the first direction and the second direction to the electrode drive circuit as a drive electrode in a first detection period; and a plurality of pixels. A display drive signal is supplied to the first electrodes in a display period for displaying an image by the pixels.

BRIEF DESCRIPTION OF THE DRAWINGS

FIG. 12B is a diagram of a second example of coupling between the first electrodes and the coupling circuit;

DETAILED DESCRIPTION

Figure 1:
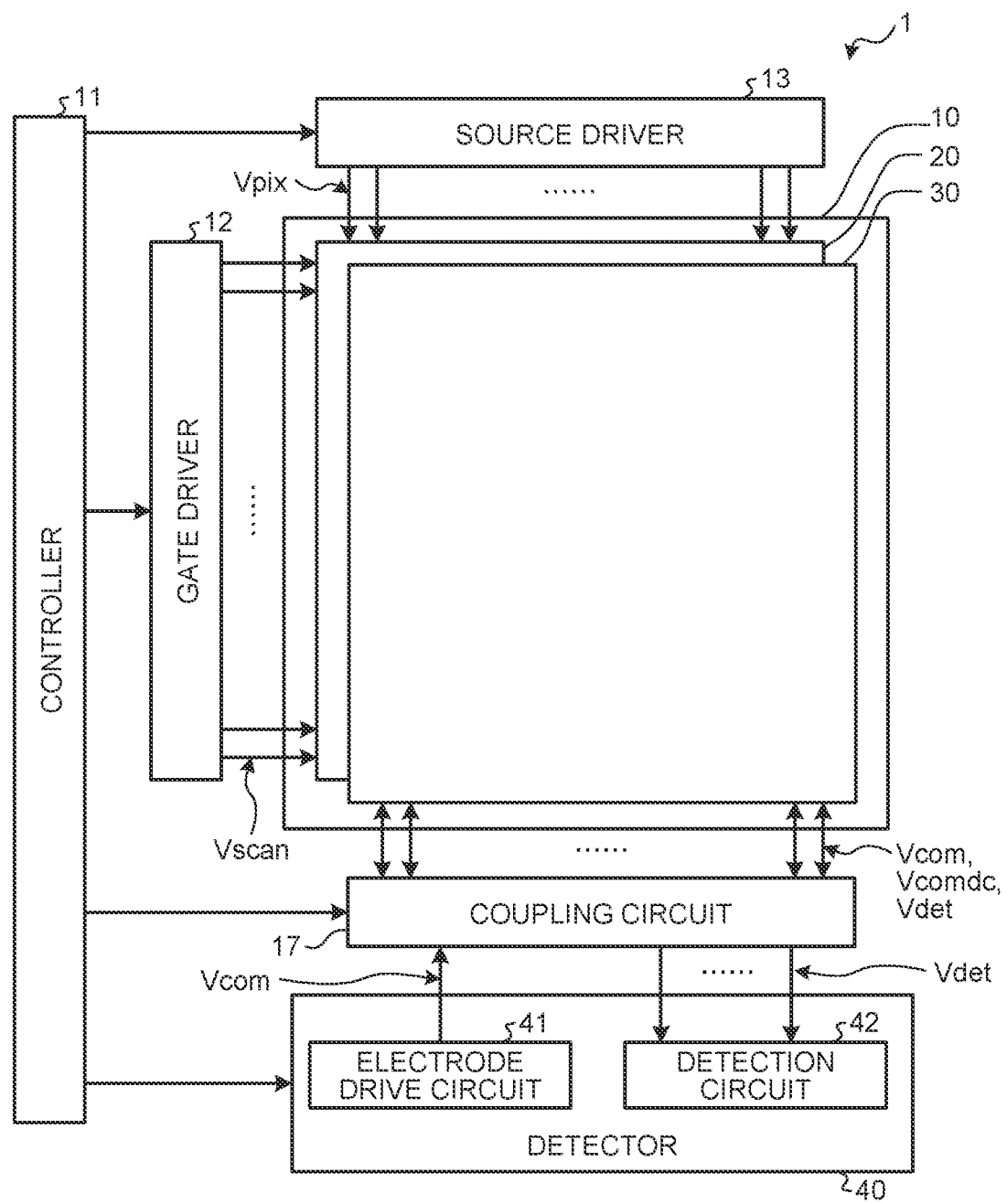
FIG. 1 is a block diagram of an example of the configuration of a detecting device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an example of the configuration of a detecting device according to a first embodiment.

A detecting device 1 according to the present embodiment is a display device in which a display unit 20 and a sensor 30 are integrated.

As illustrated in FIG. 1, the detecting device 1 includes a display panel 10, a controller 11, a gate driver 12, a source driver 13, a coupling circuit 17, and a detector 40. The display panel 10 includes the display unit 20 and the sensor 30. The display unit 20 displays an image. The sensor 30 detects an external proximity object on a detection surface.

The display panel 10 is a device in which the display unit 20 and the sensor 30 are integrated. Specifically, part of members, such as electrodes and substrates, of the display unit 20 are also used as electrodes and substrates of the sensor 30 in the display panel 10.

The display unit 20 includes liquid crystal display elements serving as display elements. The display unit 20 receives video signals Vdisp and displays an image composed of a plurality of pixels on a display surface. The display panel 10 may be a device in which the sensor 30 is mounted on the display unit 20. The display panel 10 may be a self-emitting display panel including the display unit 20 provided with self-emitting elements serving as the display elements, for example. The self-emitting element may be either an organic light emitting element the light emission layer of which is made of organic material or an inorganic light emitting element the light emission layer of which is made of inorganic material.

The controller 11 supplies control signals to the gate driver 12, the source driver 13, the coupling circuit 17, and the detector 40. The controller 11 is a circuit that controls display operations and detection operations.

The gate driver 12 supplies scanning signals Vscan to the display panel 10 based on the control signals supplied from the controller 11. More specifically, the gate driver 12 sequentially or simultaneously selects a plurality of gate lines GCL as an object to be driven for display and supplies the scanning signals Vscan to the selected gate lines GCL. Each gate line GCL is coupled to a plurality of display elements.

The source driver 13 is a circuit that supplies pixel signals Vpix to sub-pixels SPix (refer to FIG. 3) of the display unit 20. Part of the functions of the source driver 13 may be mounted on the display panel 10. In this case, the controller 11 may generate the pixel signals Vpix, and the source driver 13 may selectively supply the pixel signals Vpix supplied from the controller 11 to the sub-pixels SPix.

The sensor 30 detects an external proximity object on the detection surface. When detecting an external proximity object on the detection surface, the sensor 30 outputs detection signals Vdet.

The coupling circuit 17 is a coupling switching circuit that switches coupling and decoupling first electrodes COML to and from the detector 40. The coupling circuit 17 is a multiplexer (MUX), for example.

The detector 40 is a circuit that detects whether an external proximity object is present on the detection surface of the sensor 30 based on the control signals supplied from the controller 11 and the detection signals Vdet output from the sensor 30 via the coupling circuit 17. The detector 40 calculates coordinates or the like on the detection surface at which the external proximity object is detected.

The detector 40 includes an electrode drive circuit 41 and a detection circuit 42. The detector 40 may also include an AD converter, a signal processor, a coordinate extractor, and a detection timing controller, for example, as the components for detecting whether an external proximity object is present on the detection surface of the sensor 30.

The electrode drive circuit 41 supplies display drive signals VcomD to the first electrodes COML (refer to FIG. 4) in a display operation of displaying an image by the display unit 20. The electrode drive circuit 41 also supplies detection drive signals VcomS to the first electrodes COML in a detection operation of detecting an external proximity object by the sensor 30.

The controller 11 according to the present embodiment performs the display operations and the detection operations in a time-division manner. The electrode drive circuit 41 generates the display drive signals VcomD and the detection drive signals VcomS based on the control signals supplied from the controller 11.

The detection circuit 42 includes an amplification circuit that amplifies the detection signals Vdet and an AD conversion circuit that converts the detection signals Vdet serving as analog signals into digital signals. The amplification circuit is an integration circuit, for example. The detection circuit 42 is an analog front end (AFE), for example. Based on the detection signals Vdet digitized and output from the detection circuit 42, the signal processor removes noise, and the coordinate extractor detects whether an external proximity object is present on the detection surface. The electrode drive circuit 41 and the detection circuit 42 are controlled based on the signals supplied from the detection timing controller.

Figure 2:
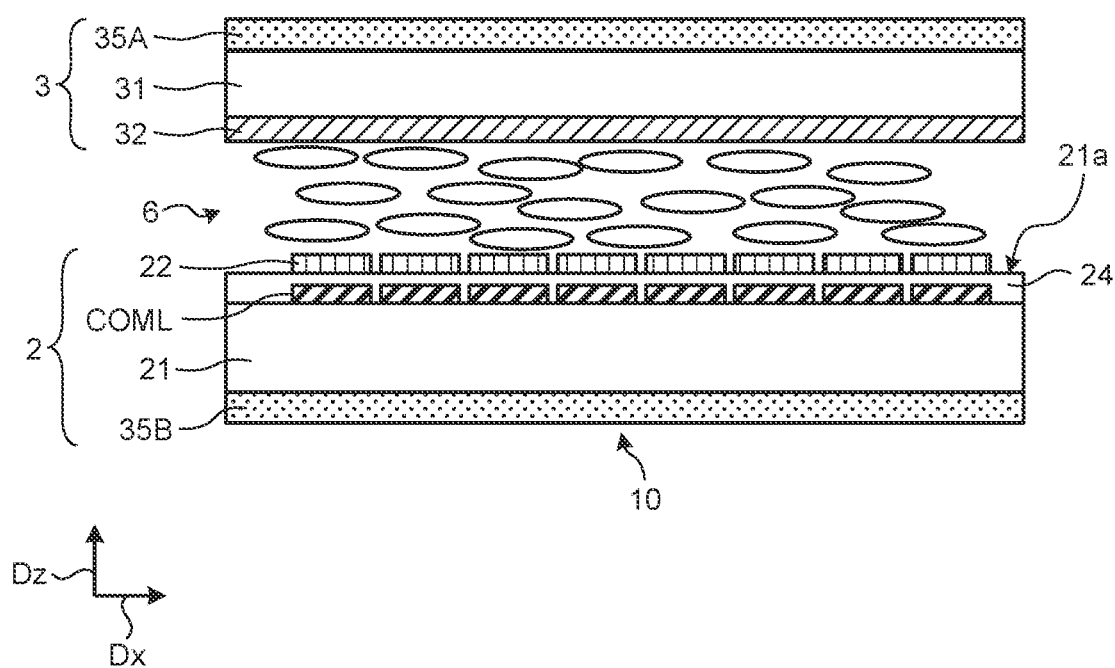
FIG. 2 is a sectional view of a schematic sectional structure of the detecting device according to the first embodiment.

The following describes an example of the configuration of the detecting device 1 according to the present embodiment in greater detail. FIG. 2 is a sectional view of a schematic sectional structure of the detecting device according to the first embodiment. As illustrated in FIG. 2, the detecting device 1 includes a pixel substrate 2, a counter substrate 3, and a liquid crystal layer 6 serving as a display functional layer for displaying an image. The counter substrate 3 is disposed facing in a direction perpendicular to a first surface 21a of a first substrate 21 of the pixel substrate 2. The liquid crystal layer 6 is provided between the pixel substrate 2 and the counter substrate 3.

The pixel substrate 2 includes the first substrate 21, pixel electrodes 22, the first electrodes COML, and a polarizing plate 35B. The first substrate 21 is provided with circuits, such as a gate scanner included in the gate driver 12, switching elements, such as thin film transistors (TFTs), and various kinds of wiring (not illustrated in FIG. 2), such as the gate lines GCL and signal lines SGL.

The first electrodes COML are provided on the first substrate 21. The pixel electrodes 22 are provided on the first electrodes COML with an insulating layer 24 interposed therebetween. The pixel electrodes 22 are provided in a layer different from that of the first electrodes COML and are disposed overlapping the first electrodes COML in planar view. The pixel electrodes 22 are disposed in a matrix (row-column configuration) in planar view. The polarizing plate 35B is provided under the first substrate 21. While the pixel electrodes 22 according to the present embodiment are provided on the first electrodes COML, the configuration is not limited thereto. The first electrodes COML may be provided on the pixel electrodes 22. In other words, the pixel electrodes 22 and the first electrodes COML are separated from each other in the direction perpendicular to the first surface 21a of the first substrate 21 with the insulating layer 24 interposed therebetween. One of the pixel electrodes 22 and the first electrodes COML are provided on the other.

In the present specification, an "upper side" refers to a direction from the first substrate 21 toward a second substrate 31 in the direction perpendicular to the first surface 21a of the first substrate 21, and a "lower side" refers to a direction from the second substrate 31 toward the first substrate 21. The "planar view" refers to a view seen from the direction perpendicular to the first surface 21a of the first substrate 21.

The pixel electrodes 22 are provided corresponding to the respective sub-pixels SPix constituting each pixel Pix in the display panel 10. The pixel signals Vpix for performing a display operation are supplied to the pixel electrodes 22 from the source driver 13 (refer to FIG. 1). In the display operation, the display drive signals VcomD are supplied to the first electrodes COML. As a result, the first electrodes COML serve as common electrodes for a plurality of pixel electrodes 22 in the display operation. The display drive signals VcomD are direct-current (DC) voltage signals, for example. If the display elements are liquid crystal display elements, the first electrodes COML are driven such that the voltage applied to the liquid crystal layer of the sub-pixels SPix is inverted. The first electrodes COML are selectively coupled to wiring for supplying the detection drive signals VcomS or the detection circuit. As a result, the first electrodes COML function as detection electrodes or drive electrodes in the detection operation.

The pixel electrodes 22 and the first electrodes COML according to the present embodiment are made of translucent conductive material, such as indium tin oxide (ITO).

The counter substrate 3 includes the second substrate 31, a color filter 32, and a polarizing plate 35A. The color filter 32 is formed on a first surface of the second substrate 31. The polarizing plate 35A is provided on a second surface of the second substrate 31. The color filter 32 faces the liquid crystal layer 6 in the direction perpendicular to the first substrate 21. The color filter 32 may be disposed on the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric field mode, such as in-plane switching (IPS) including fringe field switching (FFS). Orientation films (not illustrated in FIG. 2) are provided between the liquid crystal layer 6 and the pixel substrate 2 and between the liquid crystal layer 6 and the counter substrate 3 illustrated in FIG. 2.

An illuminator (backlight), which is not illustrated, is provided under the first substrate 21. The illuminator includes a light source, such as light emitting diodes (LEDs), and outputs light from the light source to the first substrate 21. The light from the illuminator passes through the pixel substrate 2 and is modulated depending on the state of the liquid crystals at the corresponding position. As a result, the state of light transmission to the display surface varies depending on the positions. With this mechanism, an image is displayed on the display surface.

Figure 3:
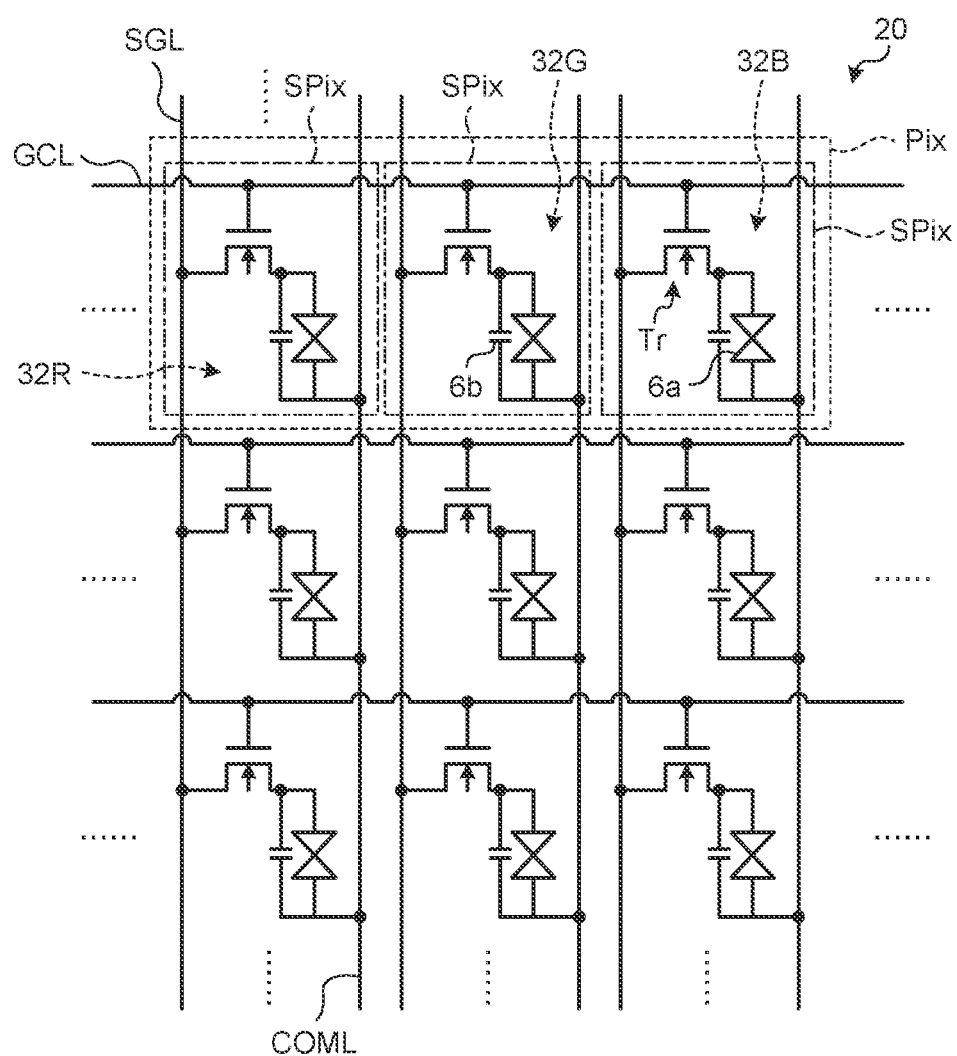
FIG. 3 is a circuit diagram of a pixel array of a display panel according to the first embodiment.

The following describes a display operation performed by the display panel 10. FIG. 3 is a circuit diagram of a pixel array of the display panel according to the first embodiment. The first substrate 21 (refer to FIG. 2) is provided with switching elements Tr of the respective sub-pixels SPix, the signal lines SGL, the gate lines GCL, and other components as illustrated in FIG. 3. Each signal line SGL and each gate line GCL are electrically coupled to a plurality of switching elements Tr. Each switching element Tr is provided at the intersection of one corresponding signal line SGL and one corresponding gate line GCL. The signal lines SGL are wiring that supplies the pixel signals Vpix to the pixel electrodes 22. The gate lines GCL are wiring that supplies the scanning signals Vscan for driving the switching elements Tr. The signal lines SGL and the gate lines GCL extend on a plane parallel to the first surface 21a of the first substrate 21.

The display unit 20 illustrated in FIG. 3 includes a plurality of sub-pixels SPix arrayed in a matrix (row-column configuration). Each of the sub-pixels SPix includes the switching element Tr and a liquid crystal element 6a. The switching element Tr is formed by a thin film transistor and is configured by an n-channel metal oxide semiconductor (MOS)-type TFT in this example. The insulating layer 24 is provided between the pixel electrodes 22 and the first electrodes COML to form holding capacitance 6b illustrated in FIG. 3.

The gate driver 12 illustrated in FIG. 1 sequentially selects the gate lines GCL. The gate driver 12 applies the scanning signals Vscan to the gates of the switching elements Tr of the respective sub-pixels SPix via the selected gate line GCL. As a result, one row (one horizontal line) out of the sub-pixels SPix is sequentially selected as an object to be driven for display. The source driver 13 supplies the pixel signals Vpix to the selected sub-pixels SPix via the signal lines SGL. The sub-pixels SPix perform display in units of one horizontal line based on the supplied pixel signals Vpix.

To perform the display operation, the electrode drive circuit 41 illustrated in FIG. 1 applies the display drive signals VcomD to the first electrodes COML. The display drive signals VcomD are voltage signals serving as a common potential for a plurality of sub-pixels SPix. As a result, the first electrodes COML serve as common electrodes for the pixel electrodes 22 in the display operation. To display an image, the electrode drive circuit 41 applies the display drive signals VcomD to all the first electrodes COML via the coupling circuit 17.

In the color filter 32 illustrated in FIG. 2, color regions of the color filter 32 in three colors of red (R), green (G), and blue (B), for example, may be periodically arrayed. The color regions 32R, 32G, and 32B in the three colors of R, G, and B serve as a set and correspond to the respective sub-pixels SPix illustrated in FIG. 3. A set of sub-pixels SPix corresponding to the respective color regions 32R, 32G, and 32B in the three colors constitute a pixel Pix. The color filter 32 may include color regions in four or more colors.

Figure 4:
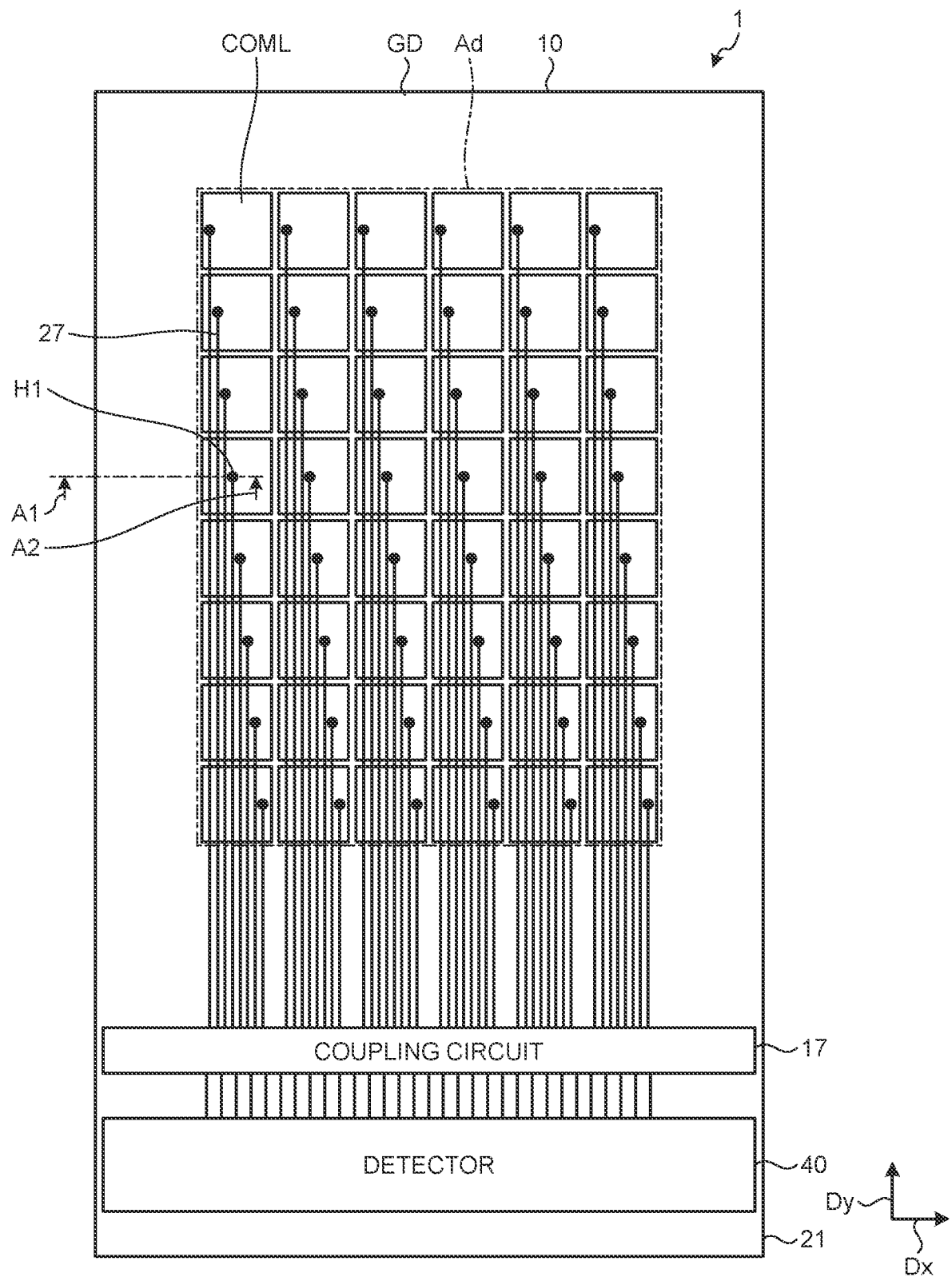
FIG. 4 is a plan view of a first substrate according to the first embodiment.

The following describes the configuration of the first electrodes COML and a detection operation. FIG. 4 is a plan view of the first substrate according to the first embodiment. As illustrated in FIG. 4, the detecting device 1 has a detection region Ad and a peripheral region Gd. In the present specification, the detection region Ad is a region overlapping a display region for displaying an image in a display operation and overlapping the pixels Pix (sub-pixels SPix) and the first electrodes COML. The peripheral region Gd is a region positioned on the inner side than the outer periphery of the first substrate 21 and on the outer side than the detection region Ad. The peripheral region Gd is a frame-like region surrounding the detection region Ad. In this case, the peripheral region Gd may also be referred to as a frame region.

A plurality of first electrodes COML according to the present embodiment are arrayed in a matrix (row-column configuration) in the detection region Ad of the first substrate 21. In other words, the first electrodes COML are arrayed in a first direction Dx and a second direction Dy. The first electrodes COML are coupled to respective wires 27. In the example illustrated in FIG. 4, each of the wires 27 is coupled to one corresponding first electrode COML in a one-to-one relation. The wires 27 extend in the second direction Dy and are arrayed in the first direction Dx with a space interposed therebetween. The first electrodes COML are coupled to the coupling circuit 17 via the respective wires 27.

The first direction Dx according to the present embodiment extends along one side of the detection region Ad. The second direction Dy is orthogonal to the first direction Dx. The first direction Dx and the second direction Dy are not limited thereto, and the second direction Dy may intersect the first direction Dx at an angle other than 90 degrees. The plane defined by the first direction Dx and the second direction Dy is parallel to the first surface 21a of the first substrate 21. A third direction Dz orthogonal to the first direction Dx and the second direction Dy is the thickness direction of the first substrate 21 (refer to FIG. 2).

As illustrated in FIG. 4, the peripheral region Gd of the first substrate 21 is provided with the coupling circuit 17 and the detector 40.

The wires 27 are provided in a layer different from that of the first electrodes COML with an insulating layer (not illustrated) interposed therebetween and are provided overlapping the first electrodes COML in planar view.

The peripheral region Gd of the first substrate 21 is also provided with a driver IC, which is not illustrated. The driver IC functions as the controller 11 illustrated in FIG. 1. The gate driver 12 and the source driver 13 illustrated in FIG. 1 may be formed on the first substrate 21 or included in the driver IC. At least part of the functions of the detector 40 illustrated in FIG. 1 may be formed on the first substrate 21 or included in the driver IC. A display driver IC and a touch driver IC may be disposed as separate ICs. At least part of the functions of the detector 40 may be included in the driver IC or provided as functions of an external micro-processing unit (MPU).

Figure 5:
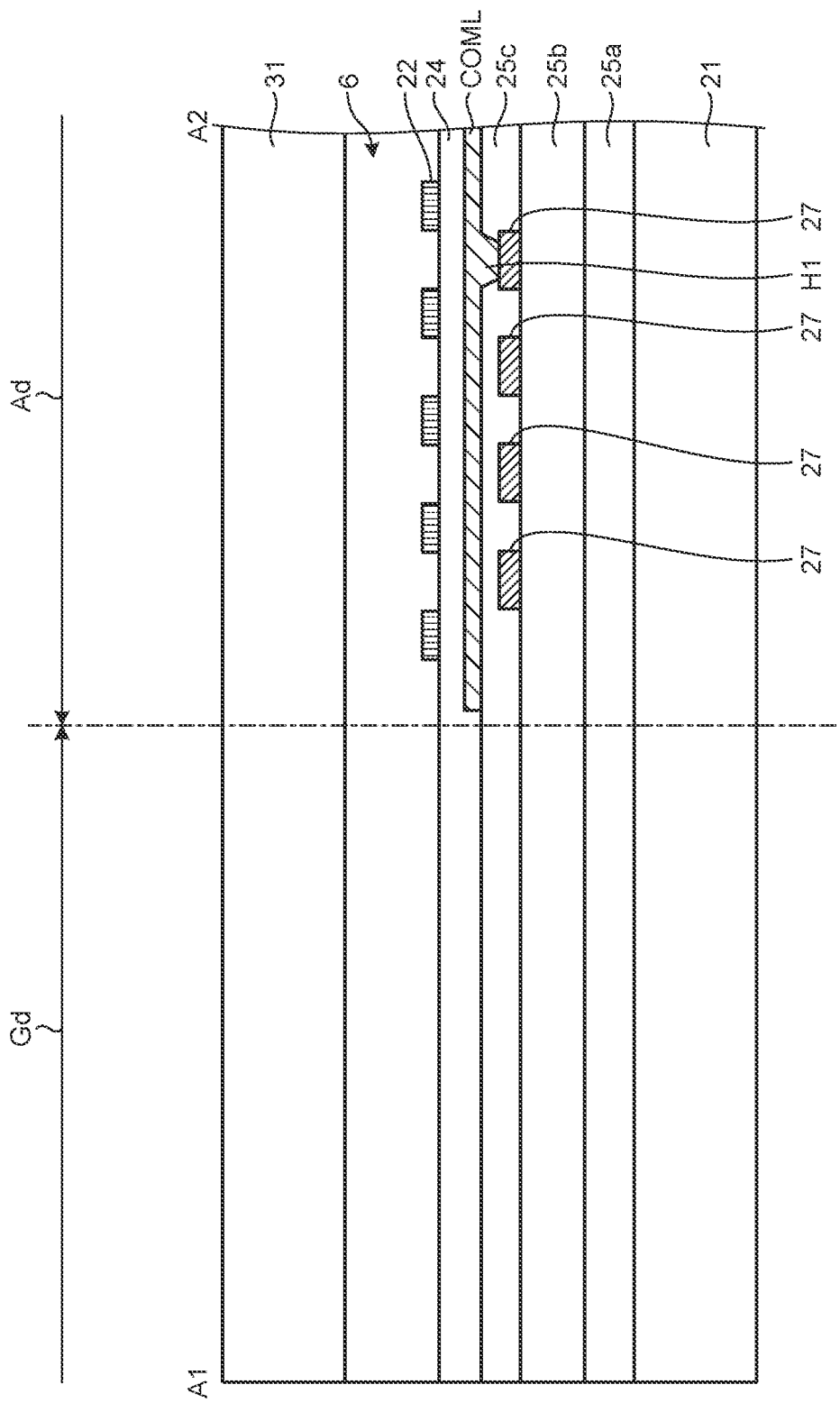
FIG. 5 is a sectional view along line A1-A2 of FIG. 4.

FIG. 5 is a sectional view along line A1-A2 of FIG. 4. As illustrated in FIG. 5, a plurality of wires 27 are provided on the first substrate 21 with an insulating layer 25a and a flattening layer 25b interposed therebetween in the detection region Ad. The first electrode COML is provided on the wires 27 with an insulating layer 25c interposed therebetween. The pixel electrodes 22 are provided on the first electrode COML with the insulating layer 24 interposed therebetween. One of the wires 27 overlapping the first electrode COML is coupled to the first electrode COML through a contact hole H1.

The detecting device 1 performs detection operations and display operations in a time-division manner as an example of the operating method of the detecting device 1. In other words, the detection period for performing the detection operation and the display period for performing the display operation do not overlap.

In the display operation, the coupling circuit 17 couples all the first electrodes COML to the electrode drive circuit 41. The electrode drive circuit 41 supplies the display drive signals VcomD to all the first electrodes COML.

In the detection operation, the coupling circuit 17 selects the first electrodes COML corresponding to a first object as detection electrodes and couples them to the detection circuit 42 of the detector 40. The coupling circuit 17 also selects the first electrodes COML corresponding to a second object different from the first object as drive electrodes and couples them to the electrode drive circuit 41.

In the detection operation, the electrode drive circuit 41 supplies the detection drive signals VcomS to the drive electrodes simultaneously or in a time-division manner. The detection electrodes output the detection signals Vdet corresponding to a change in capacitance to the detection circuit 42. Based on the detection signals Vdet received from the first electrodes COML, the detector 40 detects an external proximity object on the detection surface of the sensor 30. In other words, the first electrodes COML function not only as the common electrodes in the display operation but also as the drive electrodes or the detection electrodes in the detection operation.

The capacitance between drive electrodes TX (COML) and detection electrodes RX (COML) fluctuates due to contact or proximity of an external proximity object OBJ with or to the detection surface, whereby the detection signals Vdet (refer to FIG. 1) output from the detection electrodes RX (COML) fluctuate. The detector 40 detects the fluctuations in the detection signals Vdet, thereby detecting the external proximity object on the detection surface of the sensor 30.

Figure 6A:
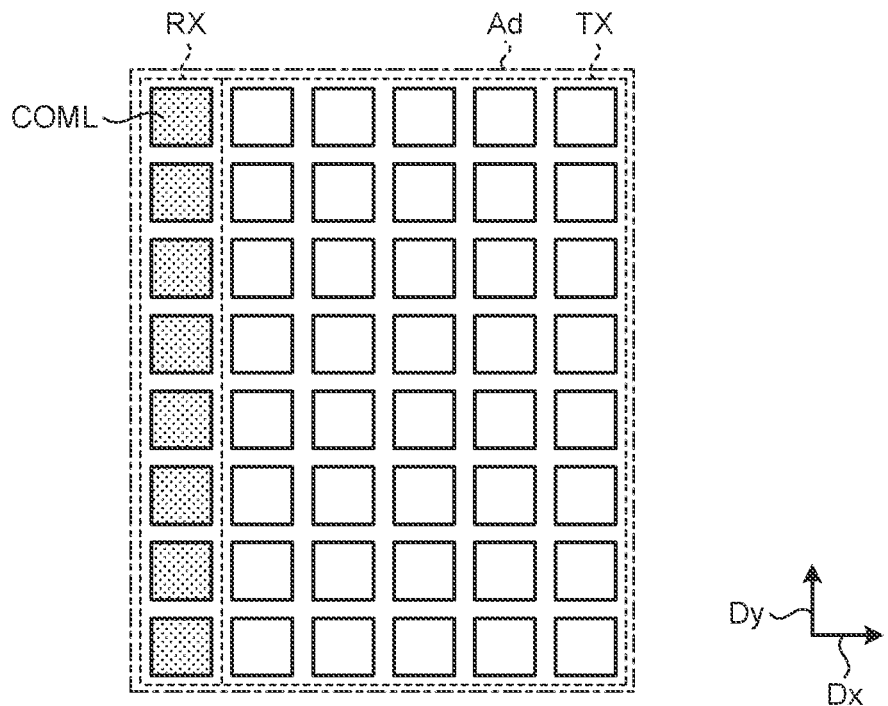
FIG. 6A is a state transition diagram of an example of setting drive electrodes and detection electrodes and a switching order according to a comparative example.
Figure 6B:
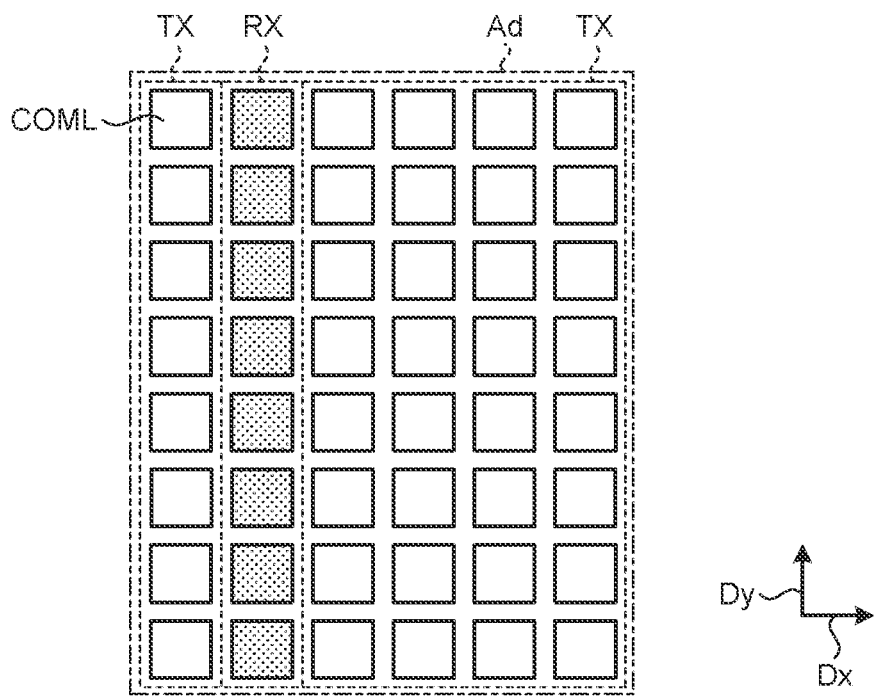
FIG. 6B is a state transition diagram of an example of setting the drive electrodes and the detection electrodes and the switching order according to the comparative example.
Figure 7A:
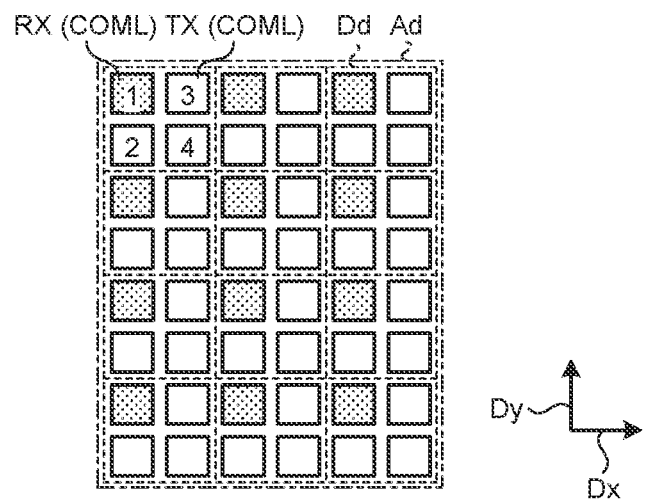
FIG. 7A is a state transition diagram of an example of setting the drive electrodes and the detection electrodes and the switching order according to the first embodiment.
Figure 7B:
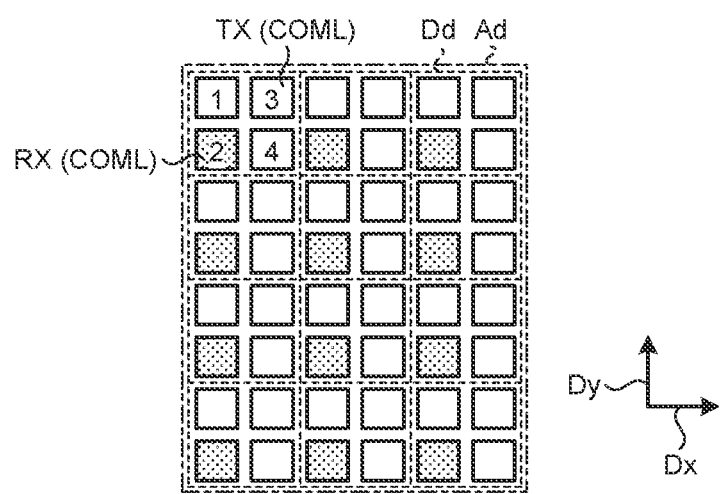
FIG. 7B is a state transition diagram of an example of setting the drive electrodes and the detection electrodes and the switching order according to the first embodiment.
Figure 7C:
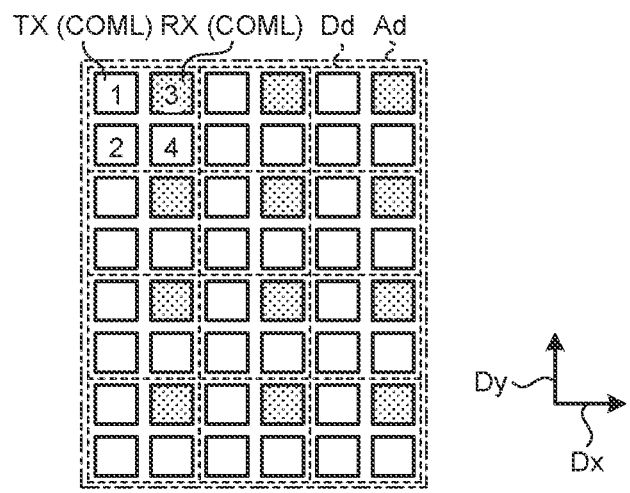
FIG. 7C is a state transition diagram of an example of setting the drive electrodes and the detection electrodes and the switching order according to the first embodiment.
Figure 7D:
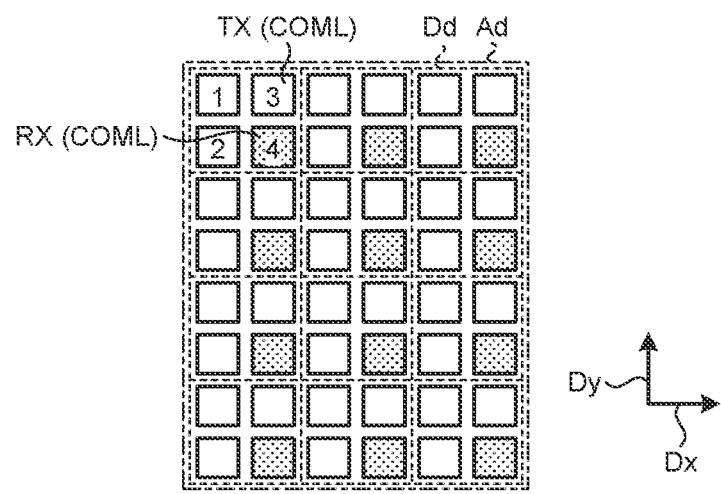
FIG. 7D is a state transition diagram of an example of setting the drive electrodes and the detection electrodes and the switching order according to the first embodiment.

FIGS. 6A and 6B are state transition diagrams of an example of setting the drive electrodes and the detection electrodes and a switching order according to a comparative example. FIGS. 7A to 7D are state transition diagrams of an example of setting the drive electrodes and the detection electrodes and the switching order according to the first embodiment. FIGS. 8A to 8D are diagrams of an example of a coupling state of the coupling circuit in the states illustrated in FIGS. 7A to 7D.

Figure 9A:
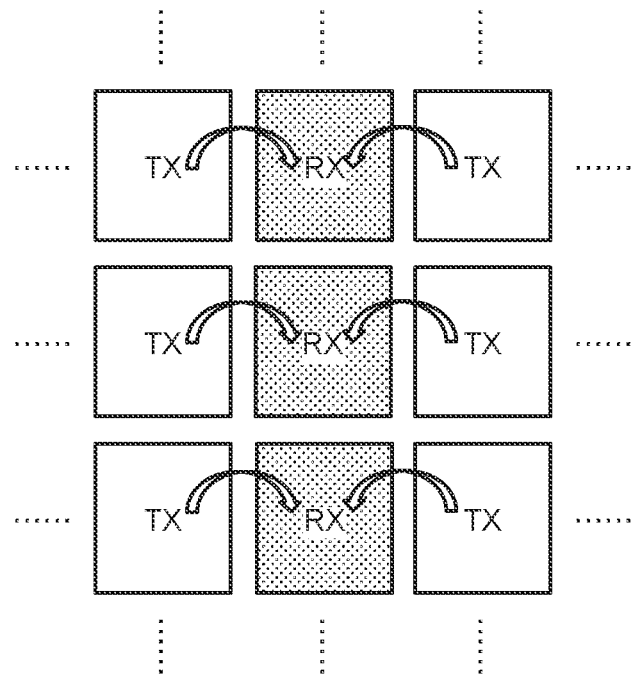
FIG. 9A is a schematic of a state of a fringe electric field generated between the drive electrodes and the detection electrodes according to the comparative example.
Figure 9B:
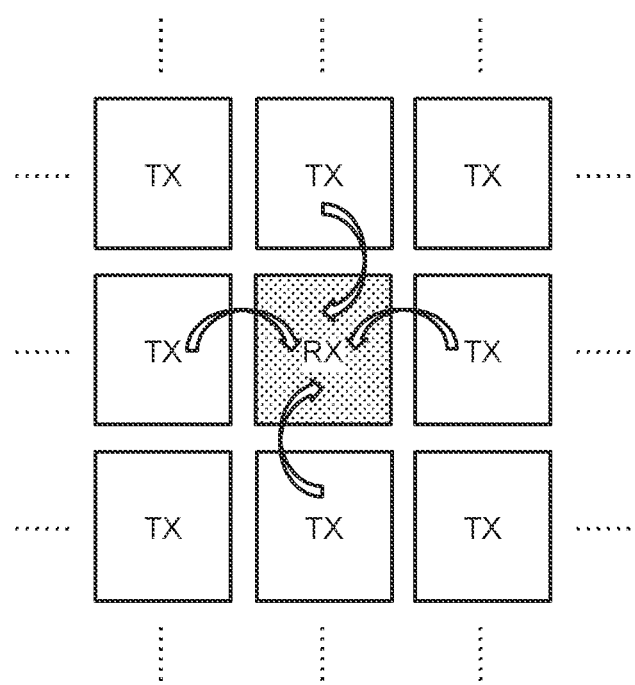
FIG. 9B is a schematic of a state of the fringe electric field generated between the drive electrodes and the detection electrodes according to the first embodiment.
Figure 11:
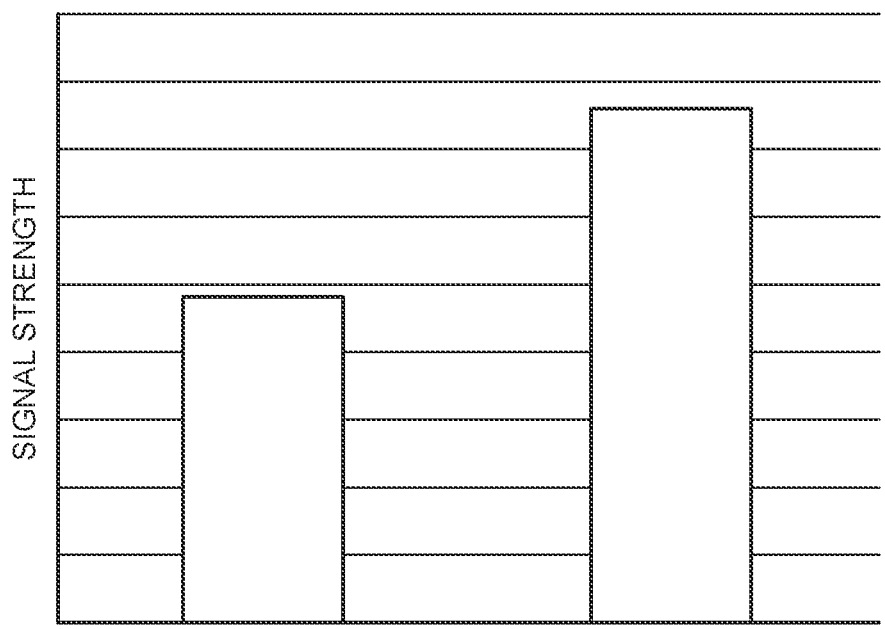
FIG. 11 is a schematic of the signal strength of detection signals output from the detection electrodes according to the comparative example illustrated in FIG. 9A and the signal strength of detection signals output from the detection electrodes according to the embodiment illustrated in FIG. 9B.

FIG. 9A is a schematic of a state of a fringe electric field generated between the drive electrodes and the detection electrodes according to the comparative example. FIG. 9B is a schematic of a state of the fringe electric field generated between the drive electrodes and the detection electrodes according to the first embodiment. In the example illustrated in FIGS. 9A and 9B, the fringe electric field is schematically represented by arrows. FIG. 11 is a schematic of the signal strength of the detection signals output from the detection electrodes according to the comparative example illustrated in FIG. 9A and the signal strength of the detection signals output from the detection electrodes according to the embodiment illustrated in FIG. 9B.

Figure 10:
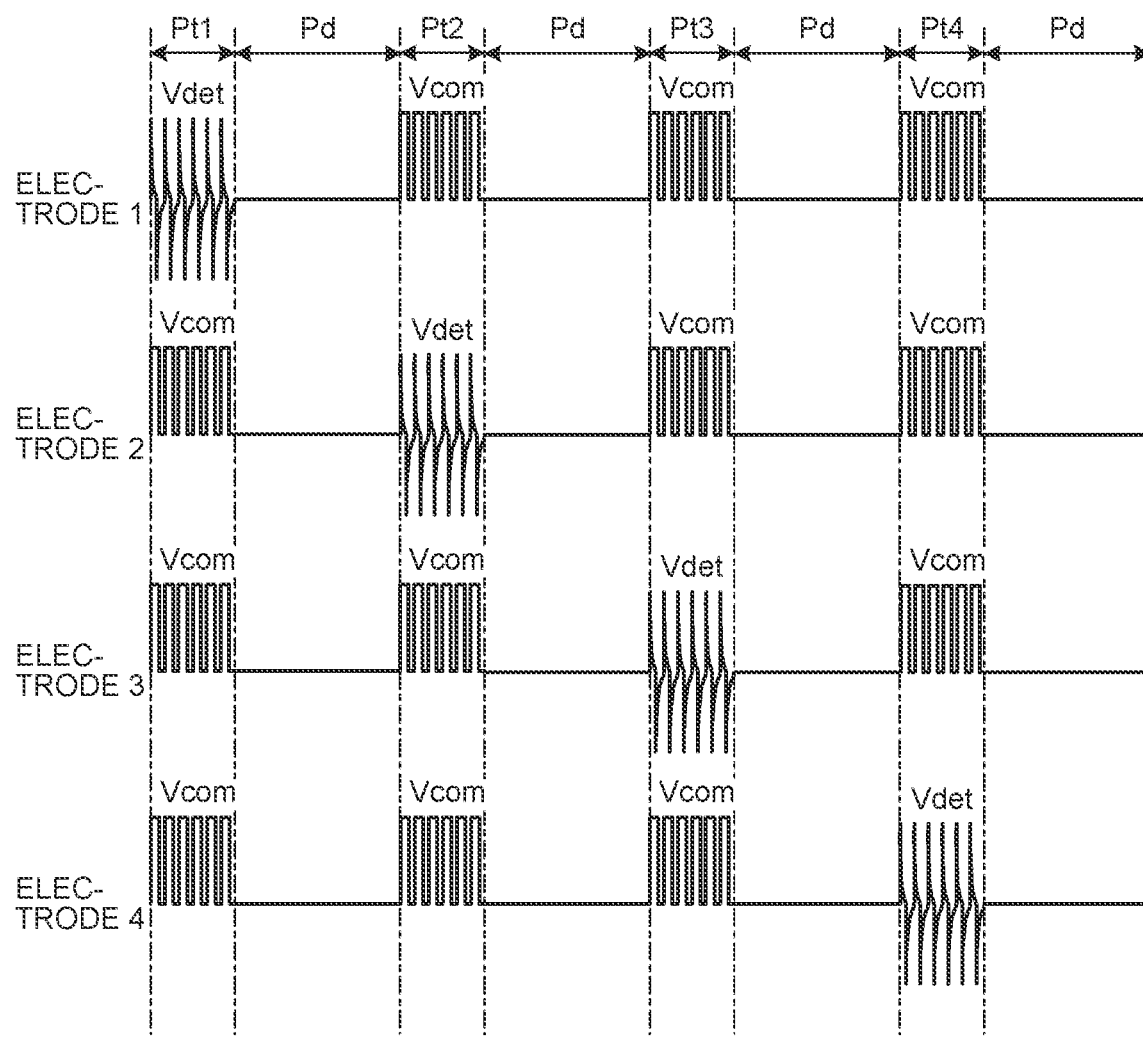
FIG. 10 is a timing chart of state transition of the electrodes.

FIG. 10 is a timing chart of state transition of the electrodes. In FIG. 10, first detection periods Pt1, Pt2, Pt3, and Pt4 are provided, and each display period Pd is provided between the first detection periods Pt1, Pt2, Pt3, and Pt4, for example. The order of the first detection periods Pt1, Pt2, Pt3, and Pt4 is not limited thereto. The first detection periods Pt1, Pt2, Pt3, and Pt4 may be continuously provided. In this case, the first detection periods Pt1, Pt2, Pt3, and Pt4 may serve as one detection period Pt, and the detection periods Pt and the display periods Pd may be provided in a time-division manner.

In the comparative example illustrated in FIGS. 6A and 6B, the first electrodes COML in one column arrayed in the second direction Dy are selected as the detection electrodes RX, and the first electrodes COML in at least the columns disposed side by side with the detection electrodes RX are selected as the drive electrodes TX. In this comparative example, the column of the first electrodes COML selected as the detection electrodes RX is switched from the column on the left in the detection region Ad in FIGS. 6A and 6B. In this case, lines of electric force of a fringe electric field are mainly generated between each detection electrode RX and two drive electrodes TX disposed side by side with the detection electrode RX in the first direction Dx as illustrated in FIG. 9A.

As illustrated in FIGS. 7A to 7D, the present embodiment defines a region surrounding four first electrodes COML composed of two pairs of first electrodes COML disposed side by side in the first direction Dx and the second direction Dy as a divided region Dd. In the example illustrated in FIG. 7A to 7D, the numbers assigned to the first electrodes COML in each divided region Dd correspond to the order of providing the first detection periods. In other words, the coupling state of the coupling circuit 17 is switched as illustrated in FIGS. 8A to 8D in order of the first detection periods Pt1, Pt2, Pt3, and Pt4 illustrated in FIG. 10. The detection electrode RX (COML) is switched in order of the numbers 1, 2, 3, and 4 assigned to the first electrodes COML in the divided region Dd. The coupling circuit 17 includes first switches SW1 and second switches SW2. Each of the first switches SW1 couples the first electrode COML to the detection circuit 42 via the wire 27. Each of the second switches SW2 couples the first electrode COML to the electrode drive circuit 41 via the wire 27. In the following description, the first electrode COML to which the number 1 is assigned is also referred to as an "electrode 1", the first electrode COML to which the number 2 is assigned is also referred to as an "electrode 2", the first electrode COML to which the number 3 is assigned is also referred to as an "electrode 3", and the first electrode COML to which the number 4 is assigned is also referred to as an "electrode 4". The first switch SW1 coupled to the electrode 1 is also referred to as a "first switch SW11", and the second switch SW2 coupled to the electrode 1 is also referred to as a "second switch SW21". Similarly, the electrodes 2, 3, and 4 are coupled to the first switches SW12, SW13, and SW14 and to the second switches SW22, SW23, and SW24, respectively. The first switches SW1 are coupled to first switch control wires SCL1, and the second switches SW2 are coupled to second switch control wires SCL2. The first switch control wires SCL1 and the second switch control wires SCL2 control the first switches SW1 and the second switches SW2, respectively, based on the control signals supplied from the controller 11. Specifically, the first switches SW11, SW12, SW13, and SW14 are coupled to the first switch control wires SCL11, SCL12, SCL13, and SCL14, respectively. The second switches SW21, SW22, SW23, and SW24 are coupled to the switch control wires SCL21, SCL22, SCL23, and SCL24, respectively.

Figure 8A:
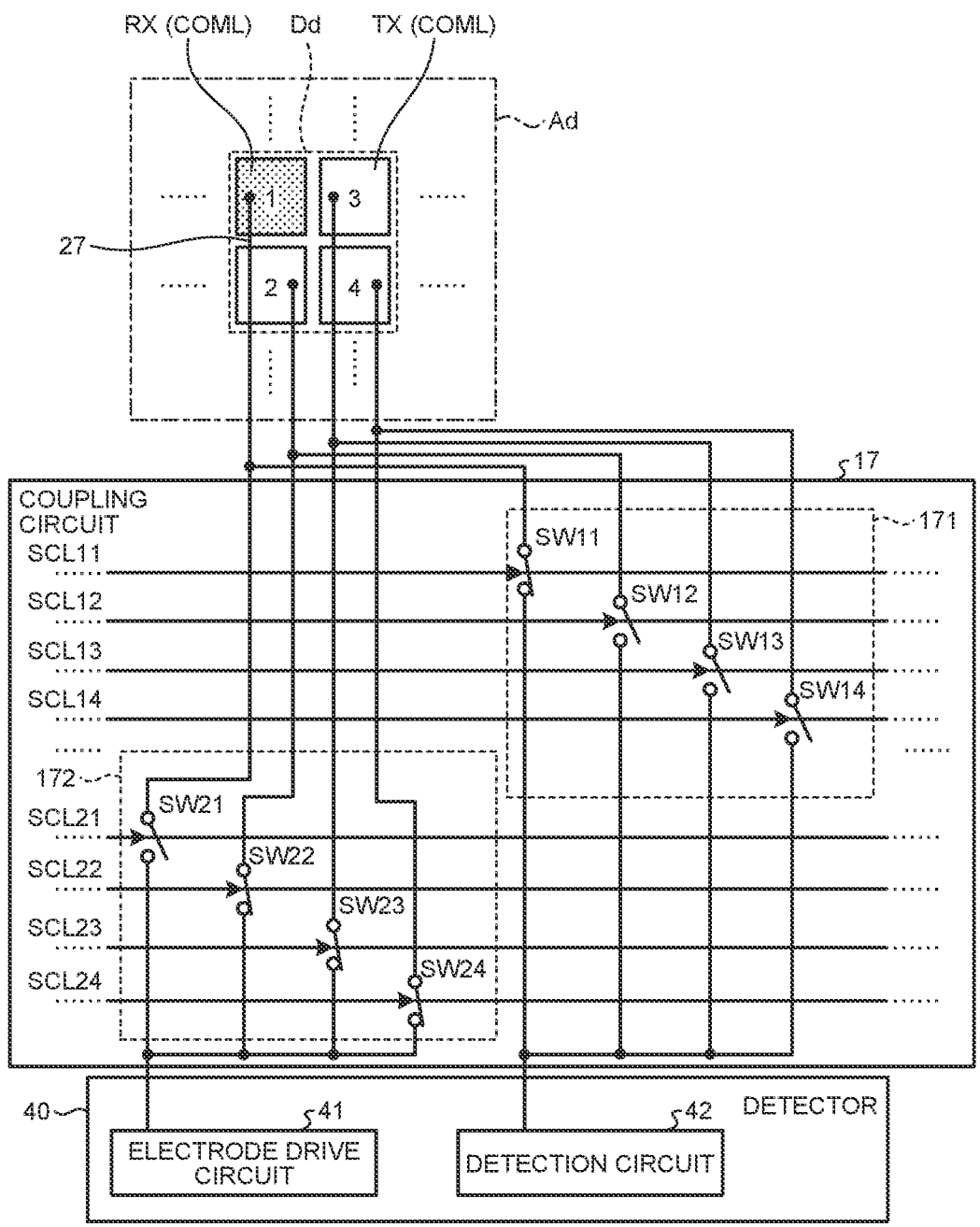
FIG. 8A is a diagram of an example of a coupling state of a coupling circuit in the state illustrated in FIG. 7A.

Specifically, in the first detection period Pt1 (refer to FIG. 10), the first switch SW11 and the second switches SW22, SW23, and SW24 are turned on, and the first switches SW12, SW13, and SW14 and the second switch SW21 are turned off as illustrated in FIG. 8A. As a result, the electrodes 2, 3, and 4 are supplied with the detection drive signals VcomS from an electrode drive circuit 14, and the electrode 1 outputs the detection signals Vdet to the detection circuit 42. At this time, the electrodes 2, 3, and 4 function as the drive electrodes TX (COML), and the electrode 1 functions as the detection electrode RX (COML).

Figure 8B:
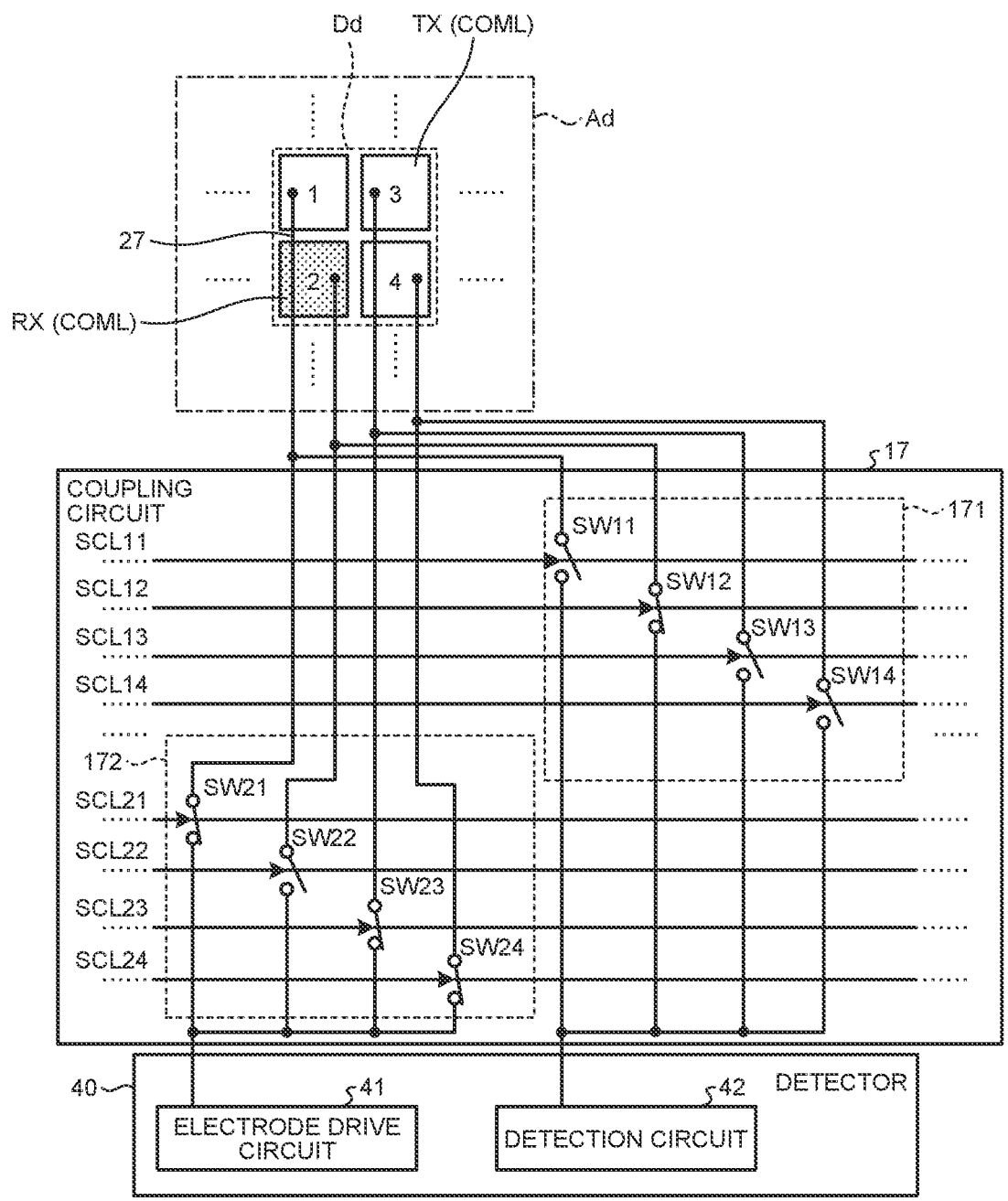
FIG. 8B is a diagram of an example of the coupling state of the coupling circuit in the state illustrated in FIG. 7B.

In the first detection period Pt2 (refer to FIG. 10), the first switch SW12 and the second switches SW21, SW23, and SW24 are turned on, and the first switches SW11, SW13, and SW14 and the second switch SW22 are turned off as illustrated in FIG. 8B. As a result, the electrodes 1, 3, and 4 are supplied with the detection drive signals VcomS from the electrode drive circuit 14, and the electrode 2 outputs the detection signals Vdet to the detection circuit 42. At this time, the electrodes 1, 3, and 4 function as the drive electrodes TX (COML), and the electrode 2 functions as the detection electrode RX (COML).

Figure 8C:
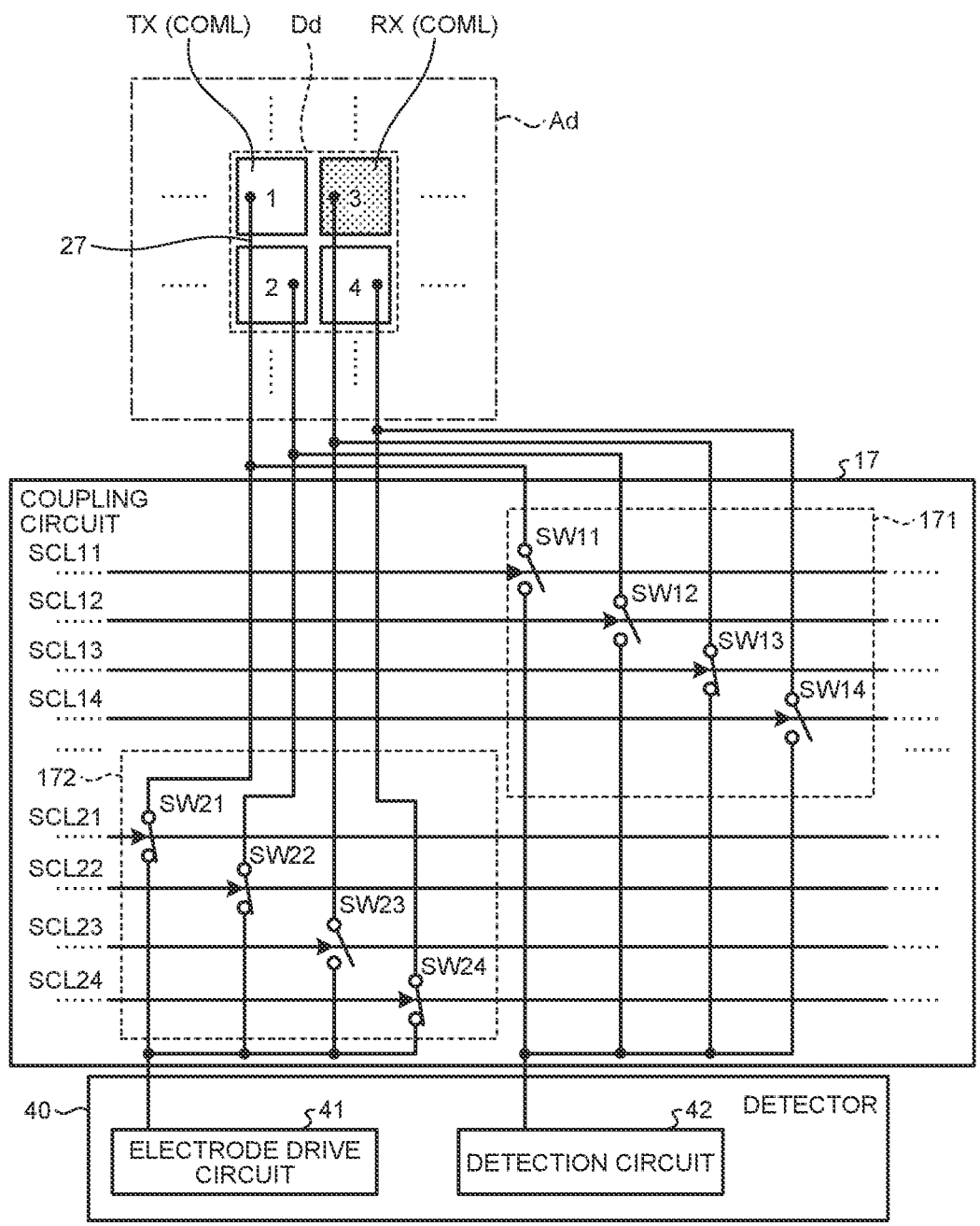
FIG. 8C is a diagram of an example of the coupling state of the coupling circuit in the state illustrated in FIG. 7C.

In the first detection period Pt3 (refer to FIG. 10), the first switch SW13 and the second switches SW21, SW22, and SW24 are turned on, and the first switches SW11, SW12, and SW14 and the second switch SW23 are turned off as illustrated in FIG. 8C. As a result, the electrodes 1, 2, and 4 are supplied with the detection drive signals VcomS from the electrode drive circuit 14, and the electrode 3 outputs the detection signals Vdet to the detection circuit 42. At this time, the electrodes 1, 2, and 4 function as the drive electrodes TX (COML), and the electrode 3 functions as the detection electrode RX (COML).

Figure 8D:
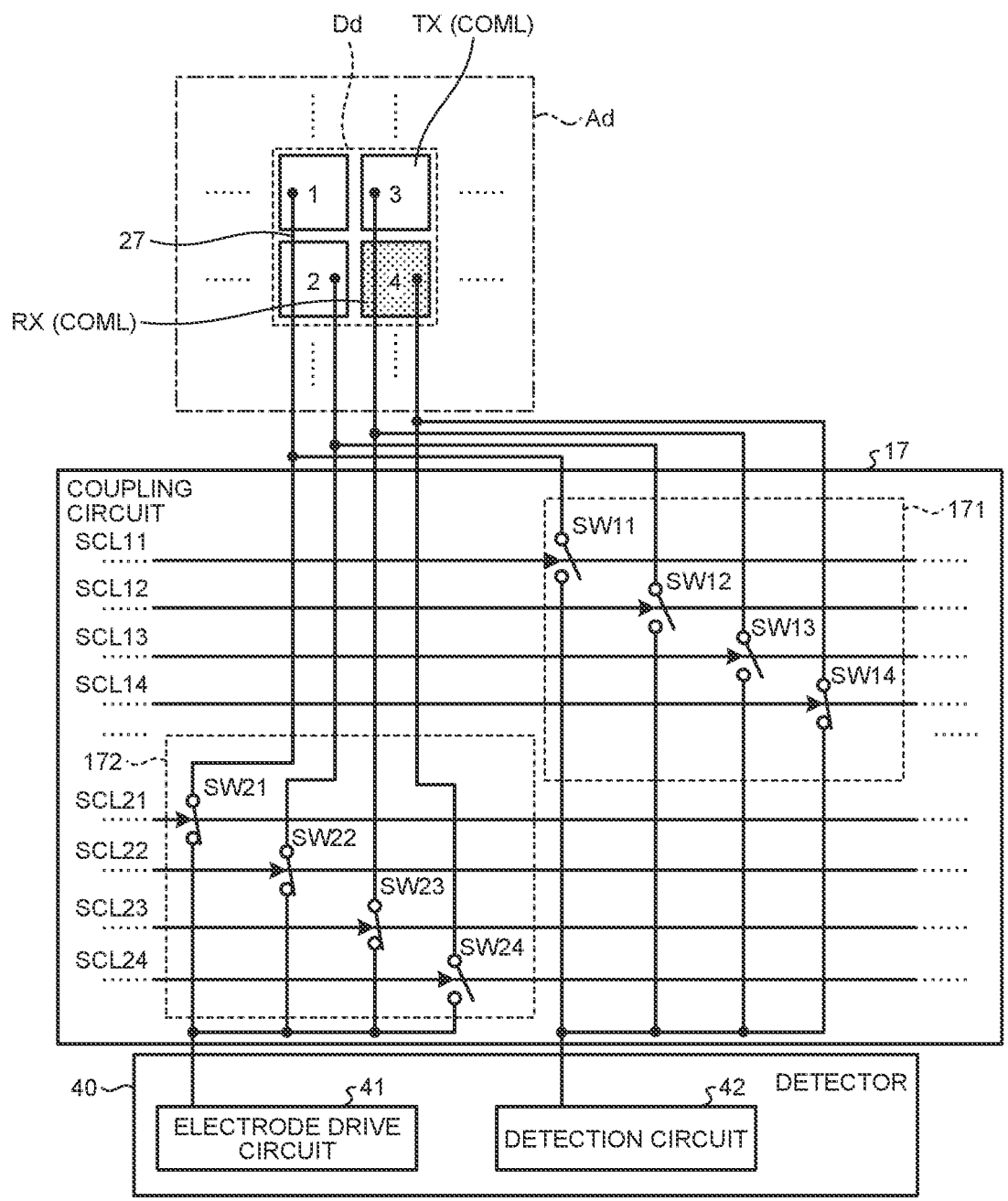
FIG. 8D is a diagram of an example of the coupling state of the coupling circuit in the state illustrated in FIG. 7D.

In the first detection period Pt4 (refer to FIG. 10), the first switch SW14 and the second switches SW21, SW22, and SW23 are turned on, and the first switches SW11, SW12, and SW13 and the second switch SW24 are turned off as illustrated in FIG. 8D. As a result, the electrodes 1, 2, and 3 are supplied with the detection drive signals VcomS from the electrode drive circuit 14, and the electrode 4 outputs the detection signals Vdet to the detection circuit 42. At this time, the electrodes 1, 2, and 3 function as the drive electrodes TX (COML), and the electrode 4 functions as the detection electrode RX (COML).

As illustrated in FIGS. 7A to 7D, each detection electrode RX (COML) is disposed side by side with the drive electrodes TX (COML) in the first direction Dx and the second direction Dy in all the first detection periods Pt1, Pt2, Pt3, and Pt4. As a result, lines of electric force of a fringe electric field are mainly generated between each detection electrode RX and two drive electrodes TX disposed side by side with the detection electrode RX in the first direction Dx and two drive electrodes TX disposed side by side with the detection electrode RX in the second direction Dy as illustrated in FIG. 9B.

This mechanism can make the signal strength of the detection signals Vdet output from the detection electrodes RX larger (approximately 1.5 times in the example illustrated in FIG. 11) than the comparative example as illustrated in FIG. 11. As a result, the detecting device 1 has higher detection sensitivity to an external proximity object.

Figure 12A:
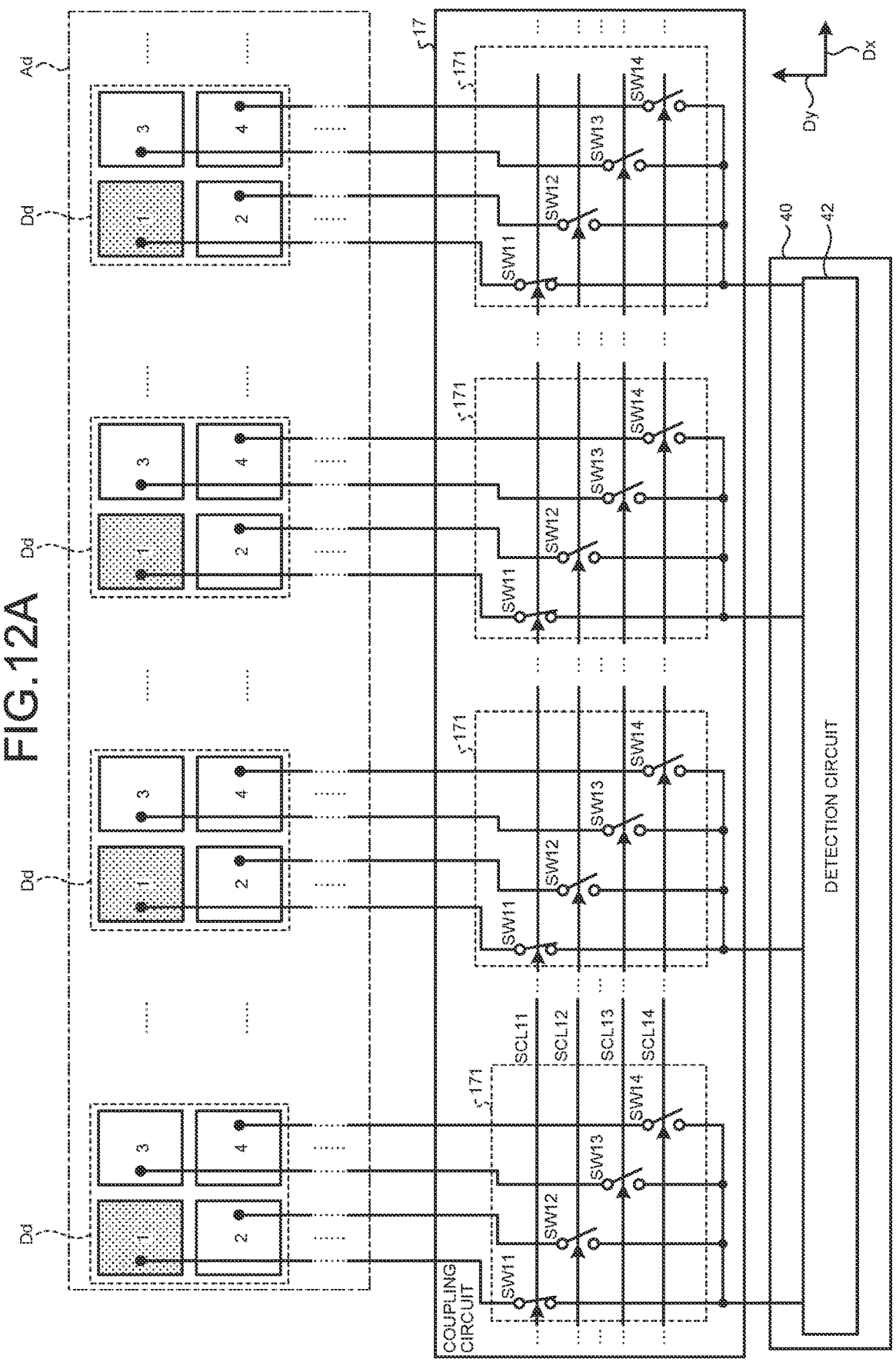
FIG. 12A is a diagram of a first example of coupling between first electrodes and the coupling circuit.

FIG. 12A is a diagram of a first example of coupling between the first electrodes and the coupling circuit. FIG. 12B is a diagram of a second example of coupling between the first electrodes and the coupling circuit. The examples in FIGS. 12A and 12B illustrate the configuration of the first switches SW1 coupled to the detection circuit 42 of the detector 40 and do not illustrate the configuration of the second switches SW2 coupled to the electrode drive circuit 41. FIGS. 12A and 12B illustrate a coupling example in the first detection period Pt1 illustrated in FIG. 10. In FIGS. 12A and 12B, the first switches SW1 are provided as first switch circuits 171 each including the first switches SW11, SW12, SW13, and SW14 and arrayed in the first direction Dx. Similarly to the first switches SW1, the second switches SW2, which are not illustrated in FIGS. 12A and 12B, are provided as second switch circuits 172 each including the second switches SW21, SW22, SW23, and SW24 and arrayed in the first direction Dx.

In FIG. 12A, one first switch circuit 171 corresponds to one divided region Dd.

By contrast, in FIG. 12B, the detection region is divided into four sub-detection regions SAd1 SAd2, SAd3, and SAd4. The electrodes 1, 2, 3, and 4 in each divided region Dd in the sub-detection regions SAd1 SAd2, SAd3, and SAd4 are distributed and coupled to four first switch circuits 171a, 171b, 171c, and 171d.

Specifically, in FIG. 12B, the electrode 1 of the sub-detection region SAd1 is coupled to the switch SW11 of the first switch circuit 171a. The electrode 2 of the sub-detection region SAd2 is coupled to the switch SW12 of the first switch circuit 171a. The electrode 3 of the sub-detection region SAd3 is coupled to the switch SW13 of the first switch circuit 171a. The electrode 4 of the sub-detection region SAd4 is coupled to the switch SW14 of the first switch circuit 171a.

The electrode 1 of the sub-detection region SAd2 is coupled to the switch SW11 of the first switch circuit 171b. The electrode 2 of the sub-detection region SAd3 is coupled to the switch SW12 of the first switch circuit 171b. The electrode 3 of the sub-detection region SAd4 is coupled to the switch SW13 of the first switch circuit 171b. The electrode 4 of the sub-detection region SAd1 is coupled to the switch SW14 of the first switch circuit 171b.

The electrode 1 of the sub-detection region SAd3 is coupled to the switch SW11 of the first switch circuit 171c. The electrode 2 of the sub-detection region SAd4 is coupled to the switch SW12 of the first switch circuit 171c. The electrode 3 of the sub-detection region SAd1 is coupled to the switch SW13 of the first switch circuit 171c. The electrode 4 of the sub-detection region SAd2 is coupled to the switch SW14 of the first switch circuit 171c.

The electrode 1 of the sub-detection region SAd4 is coupled to the switch SW11 of the first switch circuit 171d. The electrode 2 of the sub-detection region SAd1 is coupled to the switch SW12 of the first switch circuit 171d. The electrode 3 of the sub-detection region SAd2 is coupled to the switch SW13 of the first switch circuit 171d. The electrode 4 of the sub-detection region SAd3 is coupled to the switch SW14 of the first switch circuit 171d.

While this configuration complicates routing of wiring between the electrodes and the coupling circuit 17, it enables integration of the switch circuits in the coupling circuit 17. Consequently, this configuration can reduce variations in the detection value due to imbalance in the power supply wiring length.

Modifications

Figure 13:
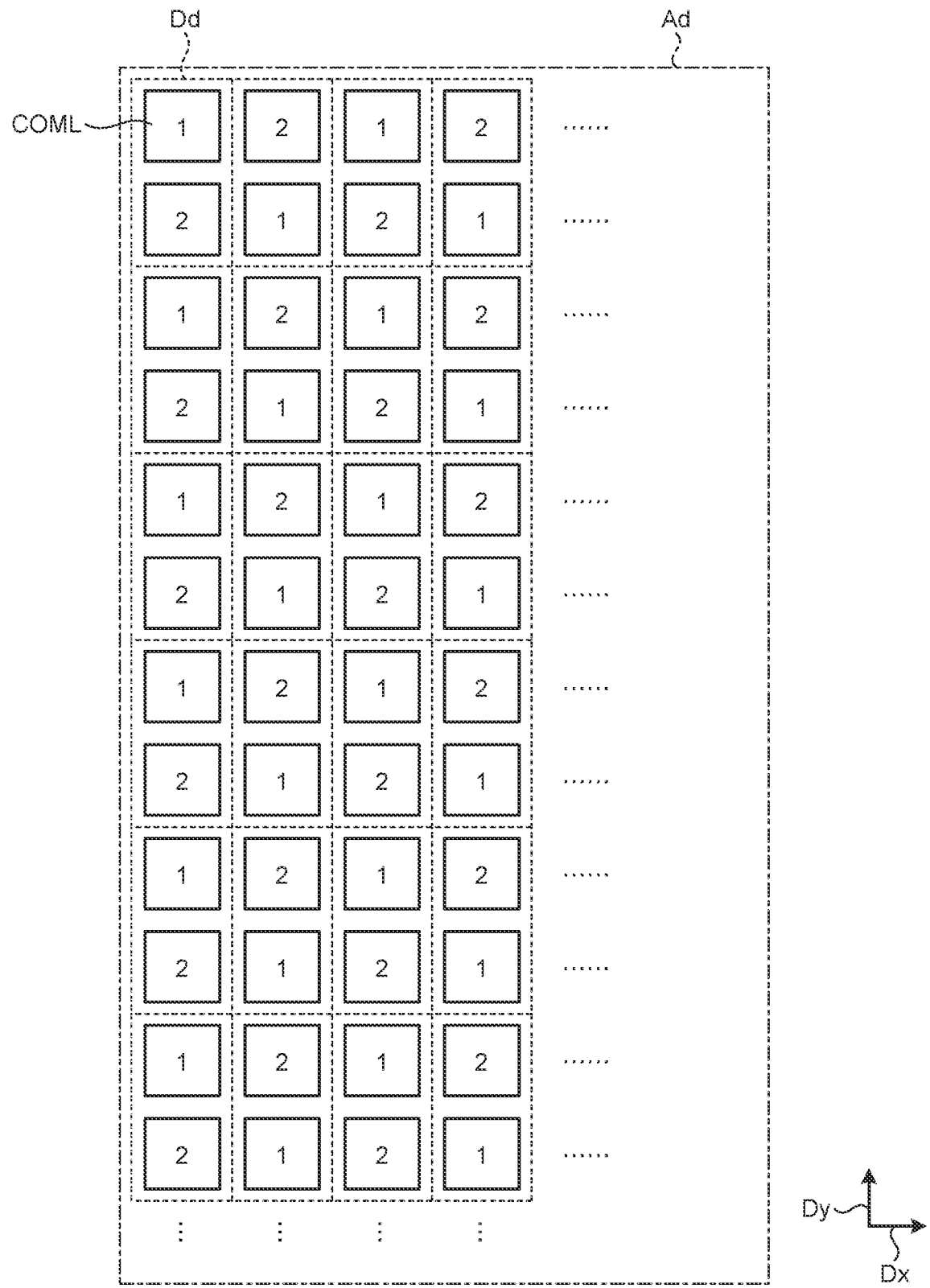
FIG. 13 is a diagram of an example of division of a detection region according to a first modification of the first embodiment.
Figure 14:
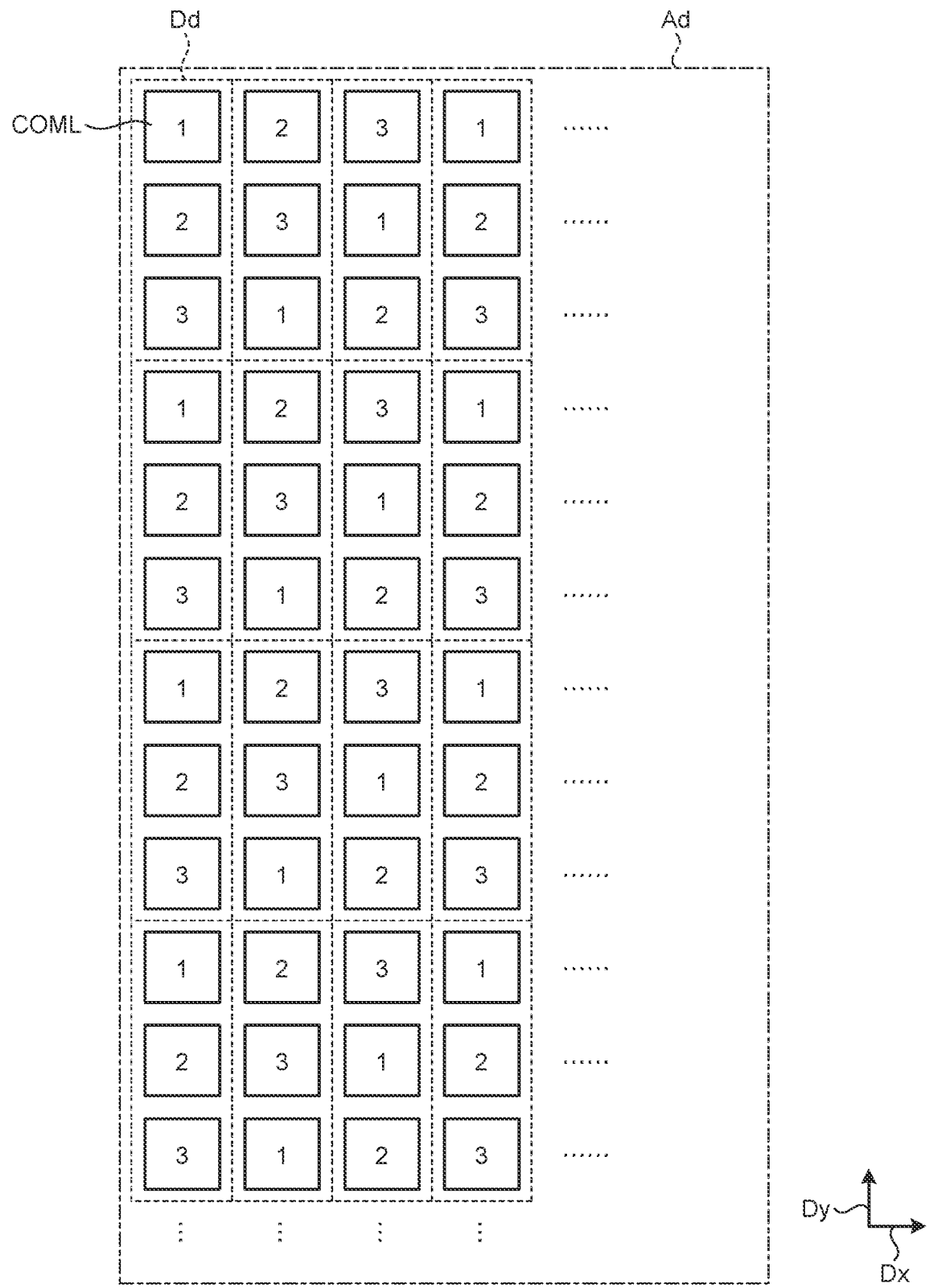
FIG. 14 is a diagram of an example of division of the detection region according to a second modification of the first embodiment.
Figure 15:
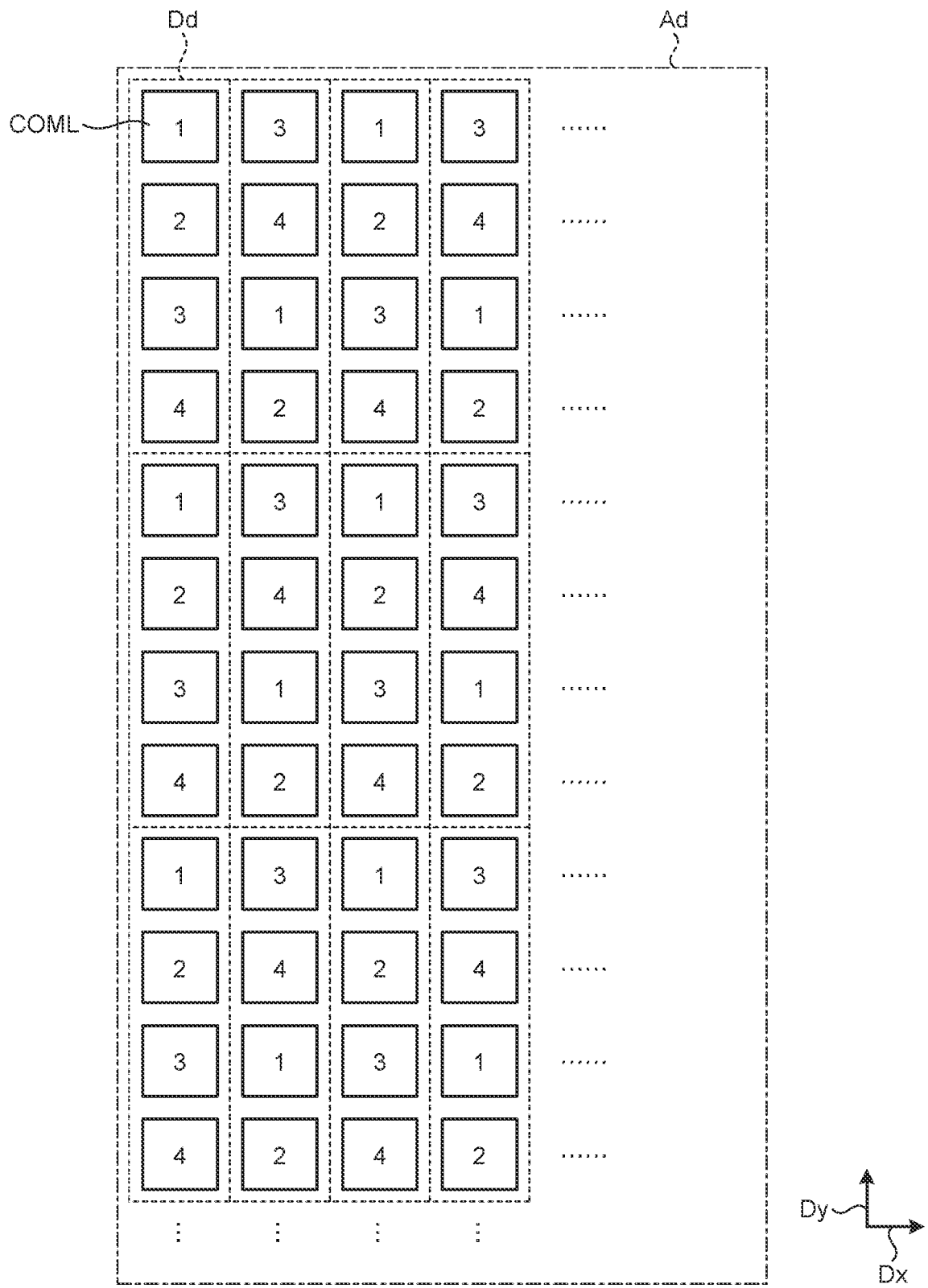
FIG. 15 is a diagram of an example of division of the detection region according to a third modification of the first embodiment.
Figure 16:
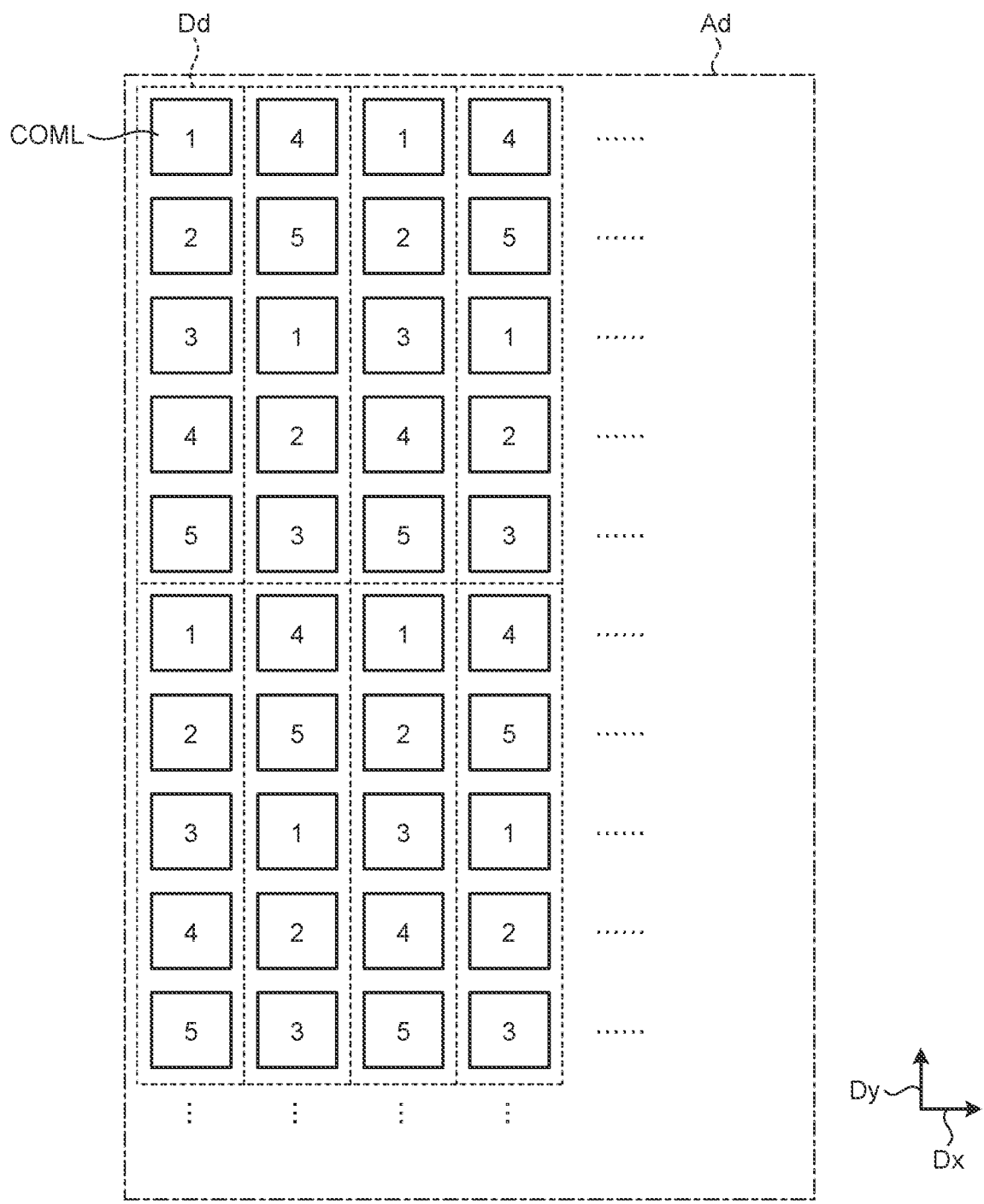
FIG. 16 is a diagram of an example of division of the detection region according to a fourth modification of the first embodiment.
Figure 17:
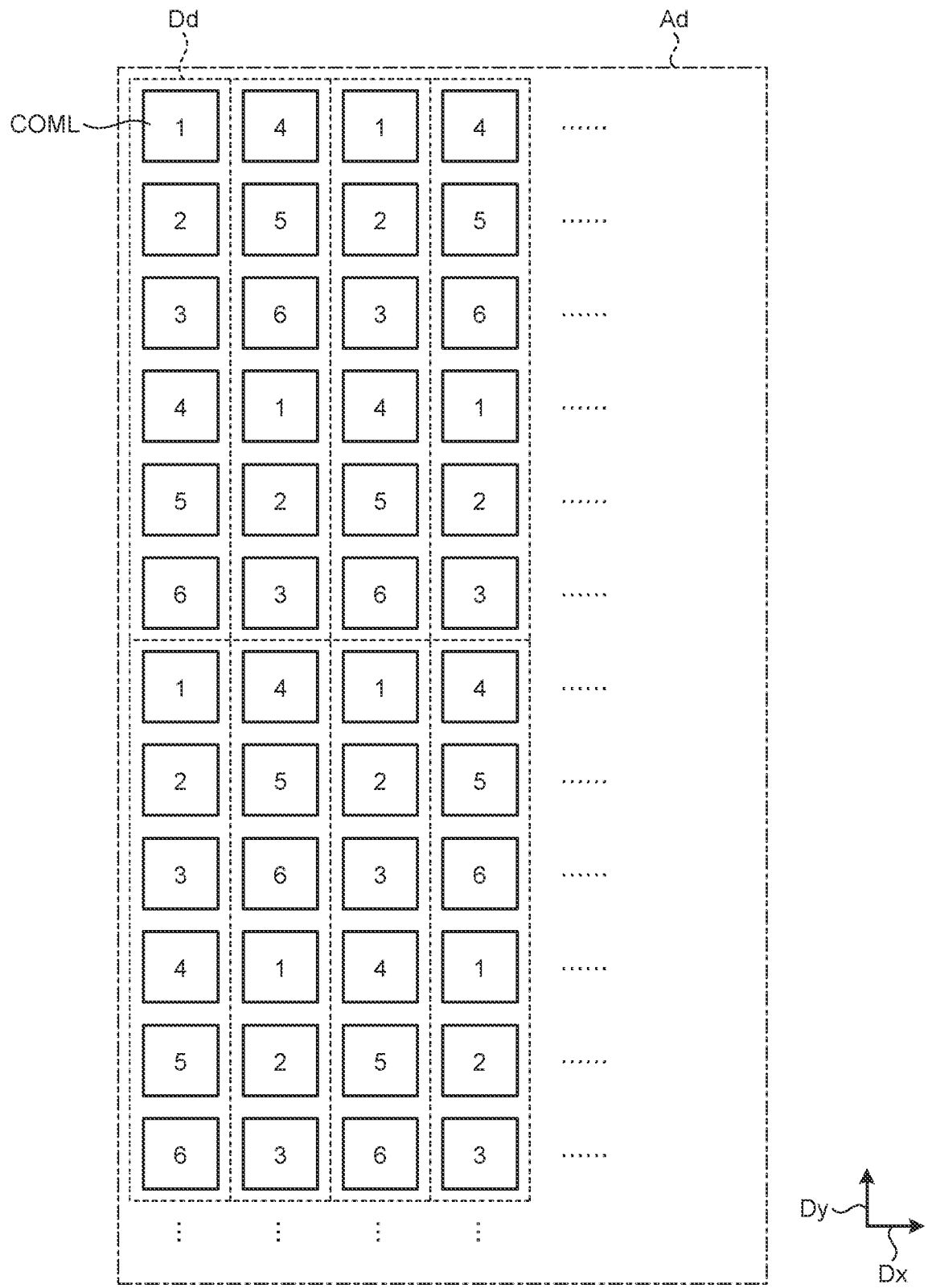
FIG. 17 is a diagram of an example of division of the detection region according to a fifth modification of the first embodiment.

FIG. 13 is a diagram of an example of division of the detection region according to a first modification of the first embodiment. FIG. 14 is a diagram of an example of division of the detection region according to a second modification of the first embodiment. FIG. 15 is a diagram of an example of division of the detection region according to a third modification of the first embodiment. FIG. 16 is a diagram of an example of division of the detection region according to a fourth modification of the first embodiment. FIG. 17 is a diagram of an example of division of the detection region according to a fifth modification of the first embodiment.

In the examples illustrated in FIGS. 13 to 17, the divided region Dd is a region surrounding a plurality of first electrodes COML arrayed in the second direction Dy. Specifically, in FIG. 13, the divided region Dd is a region surrounding two first electrodes COML arrayed in the second direction Dy. In FIG. 14, the divided region Dd is a region surrounding three first electrodes COML arrayed in the second direction Dy. In FIG. 15, the divided region Dd is a region surrounding four first electrodes COML arrayed in the second direction Dy. In FIG. 16, the divided region Dd is a region surrounding five first electrodes COML arrayed in the second direction Dy. In FIG. 17, the divided region Dd is a region surrounding six first electrodes COML arrayed in the second direction Dy. In the example illustrated in FIGS. 13 to 17, the numbers assigned to the first electrode COML in each divided region Dd correspond to the order of providing the first detection periods similarly to the examples illustrated in FIGS. 7 to 10.

More specifically, each of the first electrodes COML to which the number 1 is assigned in the first detection period Pt1 is coupled to the detection circuit 42 via the first switch SW1 based on the signals supplied from the first switch control wire SCL1. In other words, the first electrode COML to which the number 1 is assigned serves as the detection electrode RX and outputs the detection signals Vdet to the detection circuit 42. By contrast, each of the first electrodes COML to which the numbers other than 1 are assigned in the first detection period Pt1 is coupled to the electrode drive circuit 41 via the second switch SW2 based on the signals supplied from the second switch control wire SCL2. In other words, the first electrodes COML to which the numbers other than 1 are assigned in the first detection period Pt1 serve as the drive electrodes TX and output the detection drive signals VcomS. In the example illustrated in FIGS. 13 to 17, different first electrodes COML are selected as the detection electrodes RX and the drive electrodes TX in each first detection period depending on the number of first electrodes COML included in each of the divided regions Dd.

In the examples illustrated in FIGS. 13 to 17, the first electrodes COML to which the respective numbers are assigned each include the first switch circuit 171 and the second switch circuit 172 similarly to the examples illustrated in FIGS. 7 to 10. The first switch circuit 171 is composed of a plurality of first switches SW1 controlled by the respective different first switch control wires SCL1. The second switch circuit 172 is composed of a plurality of second switches SW2 controlled by the respective different second switch control wires SCL2. In FIG. 17, for example, the first switch circuit 171 includes six different first switches SW11, SW12, SW13, SW14, SW15, and SW16. The six different first switches SW1 (first switches SW11 to SW16) are controlled by different first switch control wires SCL11, SCL12, SCL13, SCL14, SCL15, and SCL16, respectively.

As illustrated in FIGS. 13 to 17, the first electrodes COML disposed side by side in the first direction Dx do not simultaneously serve as the detection electrodes between the divided regions Dd disposed side by side in the first direction Dx in the modifications of the first embodiment. In other words, each detection electrode is disposed side by side with the drive electrodes in the first direction Dx. In addition, the first electrodes COML disposed side by side in the second direction Dy do not simultaneously serve as the detection electrodes between the divided regions Dd disposed side by side in the second direction Dy. In other words, each detection electrode is disposed side by side with the drive electrodes in the second direction Dy.

While the divided region Dd is a region surrounding a plurality of first electrodes COML arrayed in the second direction Dy in the examples illustrated in FIGS. 13 to 17, the configuration is not limited thereto. The divided region Dd may be a region surrounding a plurality of first electrodes COML arrayed in the first direction Dx.

Second Embodiment

Figure 18:
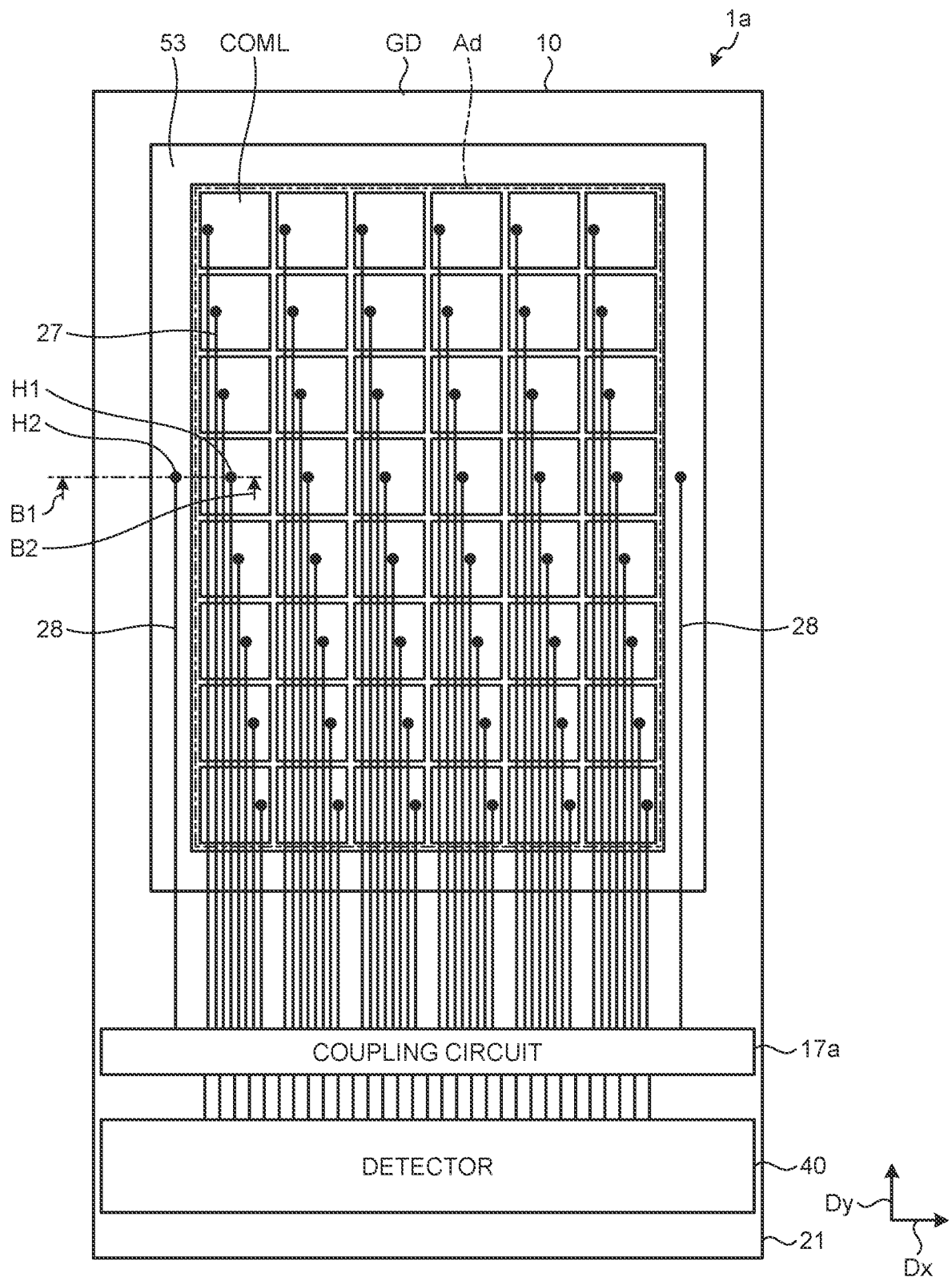
FIG. 18 is a plan view of the first substrate according to a second embodiment.

FIG. 18 is a plan view of the first substrate according to a second embodiment. In a detecting device 1a according to the present embodiment, a second electrode 53 surrounding the detection region Ad is provided in the peripheral region Gd. The second electrode 53 is coupled to the coupling circuit 17 via wires 28.

Figure 19:
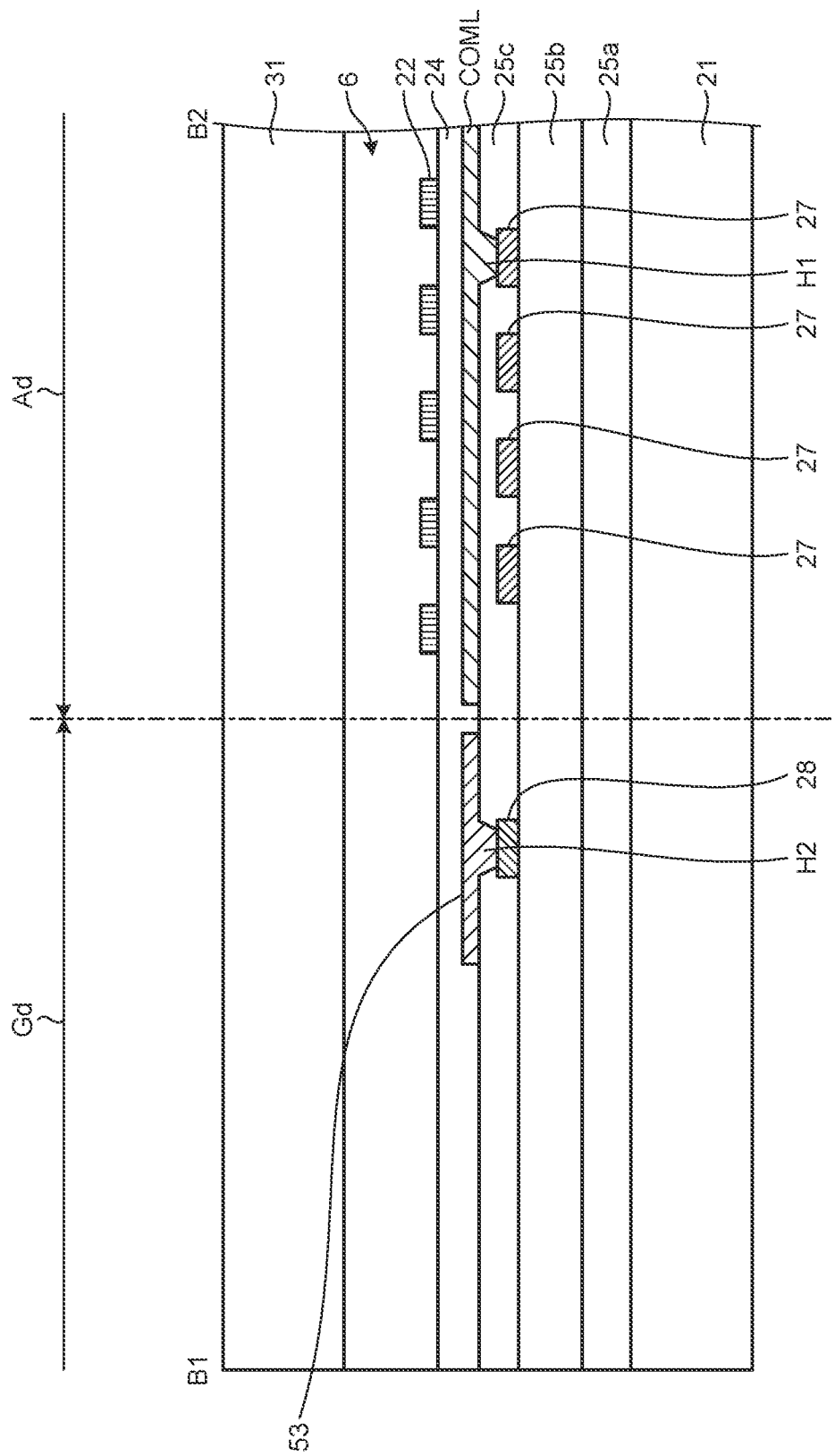
FIG. 19 is a sectional view along line B1-B2 of FIG. 18.

FIG. 19 is a sectional view along line B1-B2 of FIG. 18. As illustrated in FIG. 19, the wire 28 is provided on the first substrate 21 with the insulating layer 25a and the flattening layer 25b interposed therebetween in the peripheral region Gd. The second electrode 53 is provided on the wire 28 with the insulating layer 25c interposed therebetween. The wire 28 overlapping the second electrode 53 is coupled to the second electrode 53 through a contact hole H2. While two wires 28 are provided in the peripheral region Gd and are coupled to the second electrode 53 through the respective contact holes H2 in FIG. 18, the configuration is not limited thereto. At least one wire 28 is coupled to the second electrode 53 through the contact hole H2. The positions of the wire 28 and the contact hole H2 are not particularly limited.

Figure 20:
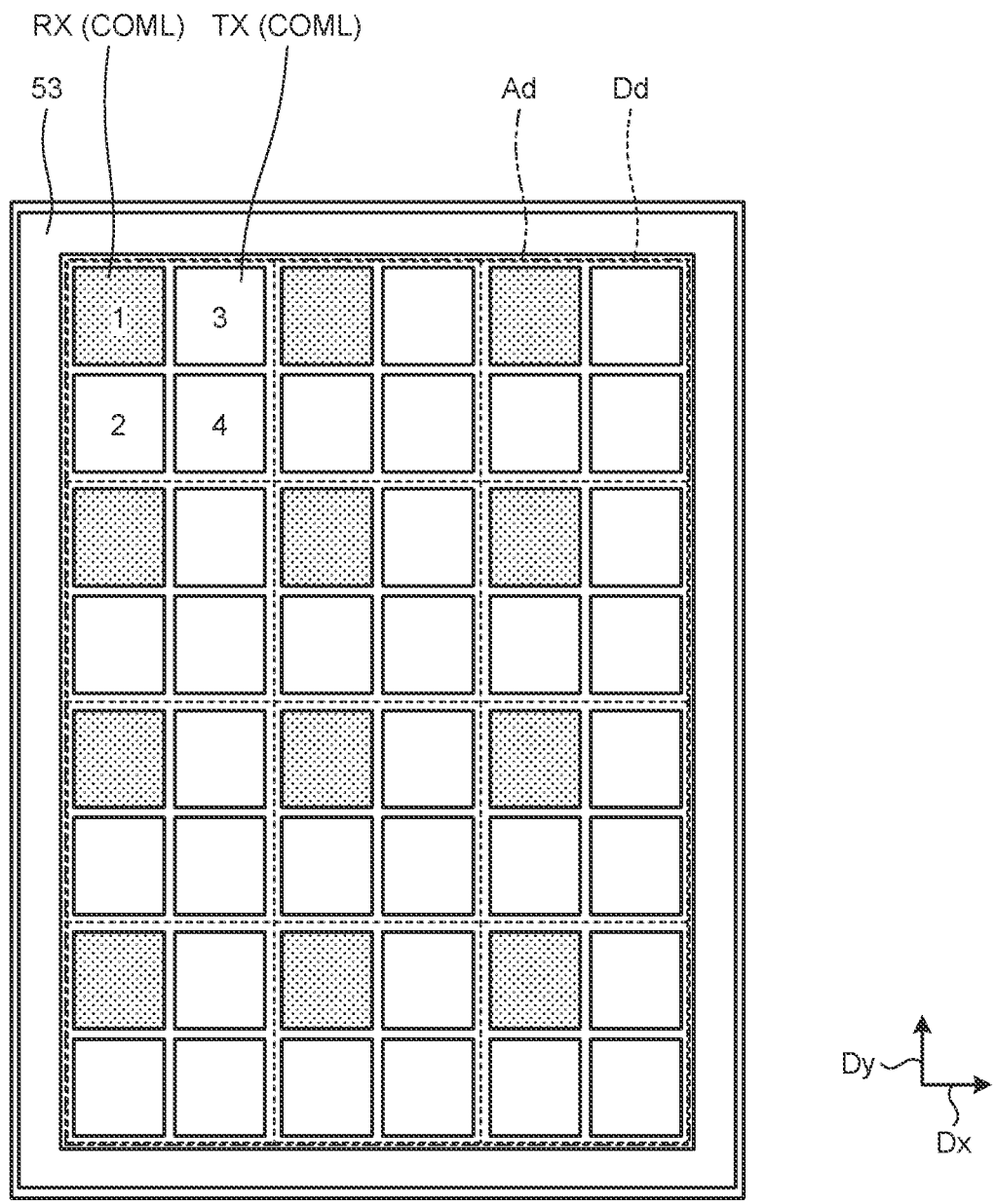
FIG. 20 is a schematic of the detection region and a peripheral region according to the second embodiment.
Figure 21:
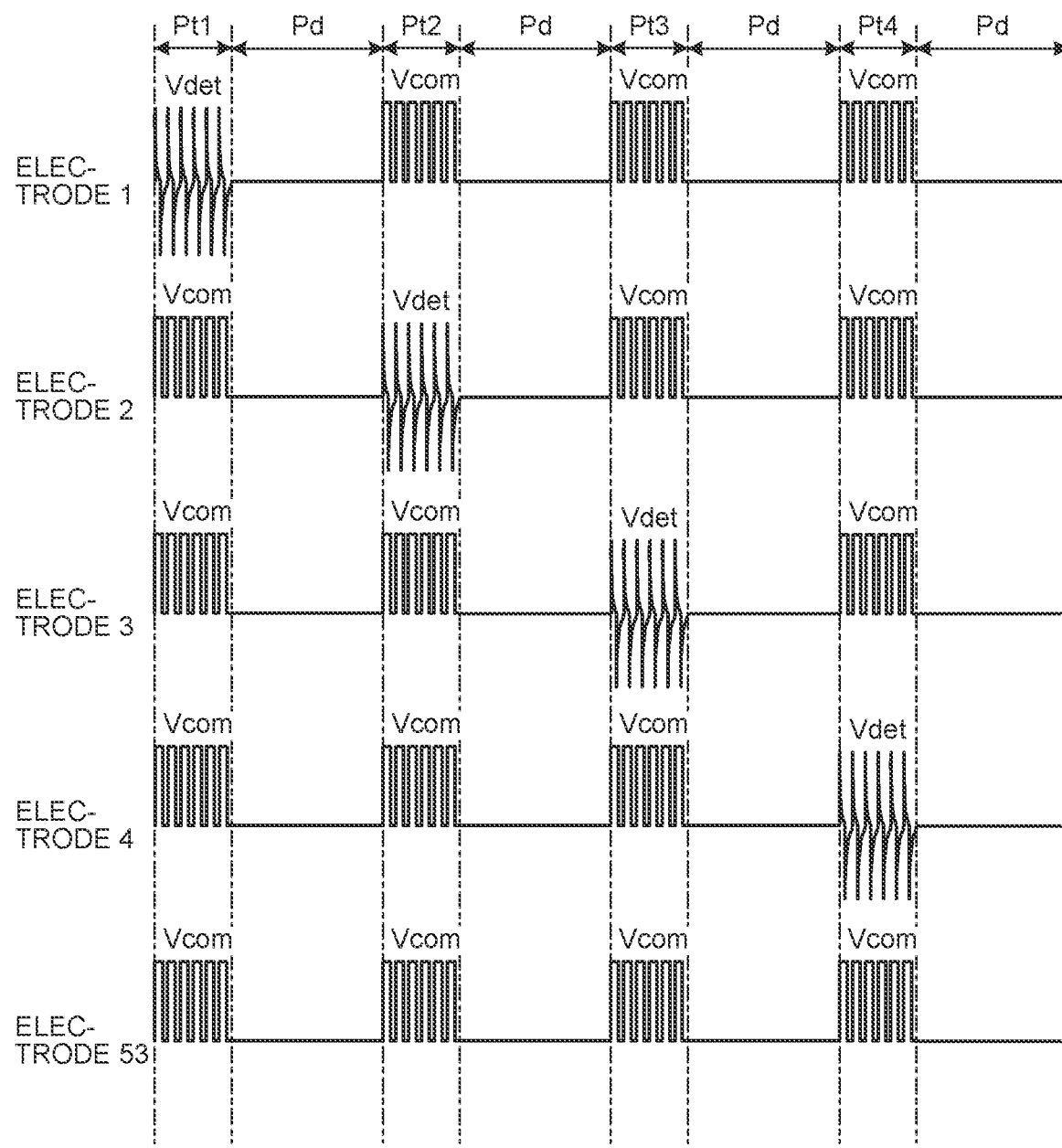
FIG. 21 is a timing chart of state transition of the electrodes according to the second embodiment.

FIG. 20 is a schematic of the detection region and the peripheral region according to the second embodiment. FIG. 21 is a timing chart of state transition of the electrodes according to the second embodiment.

As illustrated in FIG. 21, the divided regions Dd in the detection region Ad and the state transition of the electrodes 1, 2, 3, and 4 in the detection region Ad in the first detection periods Pt1, Pt2, Pt3, and Pt4 in the example illustrated in FIG. 20 are the same as those according to the first embodiment described with reference to FIGS. 7A to 7D and FIG. 10.

As illustrated in FIG. 21, the present embodiment couples the second electrode 53 to the electrode drive circuit 41 via a coupling circuit 17a in the first detection periods Pt1, Pt2, Pt3, and Pt4. The present embodiment selects the second electrode 53 as the drive electrode and supplies it with the detection drive signals VcomS.

As a result, the second electrode 53 serving as the drive electrode and supplied with the detection drive signals VcomS generates lines of electric force of a fringe electric field. The lines of electric force can increase the signal strength of the detection signals Vdet output from the first electrodes COML serving as the detection electrodes RX (COML) in the divided regions Dd abutting on the peripheral region Gd. As a result, the detecting device 1a has higher detection sensitivity to an external proximity object at the ends (also called edges) of the detection region Ad.

The aspect of the divided regions Dd in the detection region Ad may be the aspect according to the modifications of the first embodiment described with reference to FIGS. 13 to 17.

Third Embodiment

Figure 22:
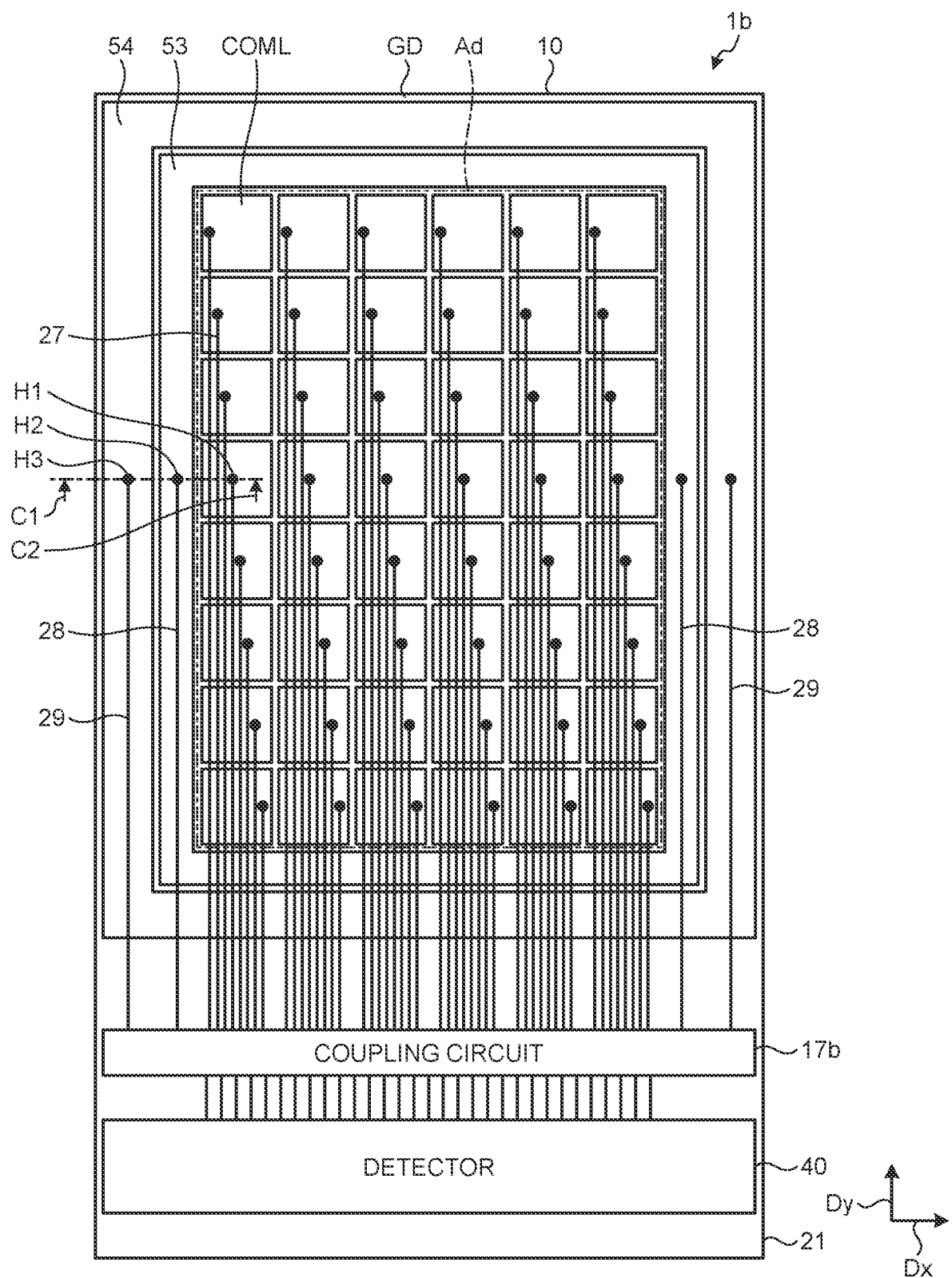
FIG. 22 is a plan view of the first substrate according to a third embodiment.

FIG. 22 is a plan view of the first substrate according to a third embodiment. In a detecting device 1b according to the present embodiment, a third electrode 54 surrounding the second electrode 53 is provided in the peripheral region Gd. The third electrode 54 is coupled to the coupling circuit 17 via wires 29.

Figure 23:
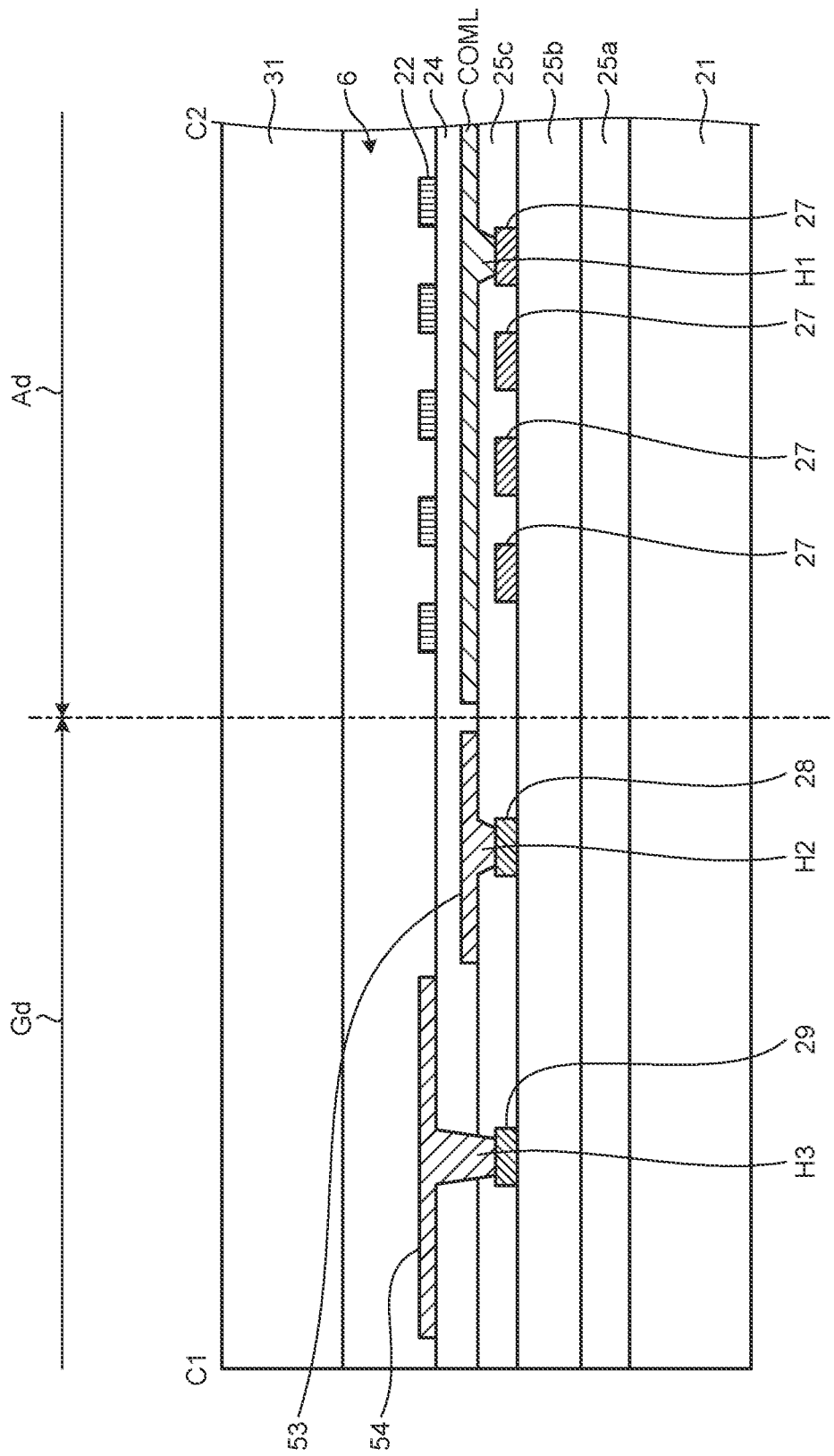
FIG. 23 is a sectional view along line C1-C2 of FIG. 22.

FIG. 23 is a sectional view along line C1-C2 of FIG. 22. As illustrated in FIG. 23, the wire 29 is provided on the first substrate 21 with the insulating layer 25a and the flattening layer 25b interposed therebetween in the peripheral region Gd. The third electrode 54 is provided on the wire 29 with the insulating layer 25c and the insulating layer 24 interposed therebetween. The wire 29 overlapping the third electrode 54 is coupled to the second electrode 53 through a contact hole H3. While two wires 29 are provided in the peripheral region Gd and are coupled to the third electrode 54 through the respective contact holes H3 in FIG. 22, the configuration is not limited thereto. At least one wire 29 is coupled to the third electrode 54 through the contact hole H3. The positions of the wire 29 and the contact hole H3 are not particularly limited. While the third electrode 54 and the second electrode 53 are provided in different layers in the example illustrated in FIG. 23, the third electrode 54 and the second electrode 53 may be provided in the same layer.

Figure 24:
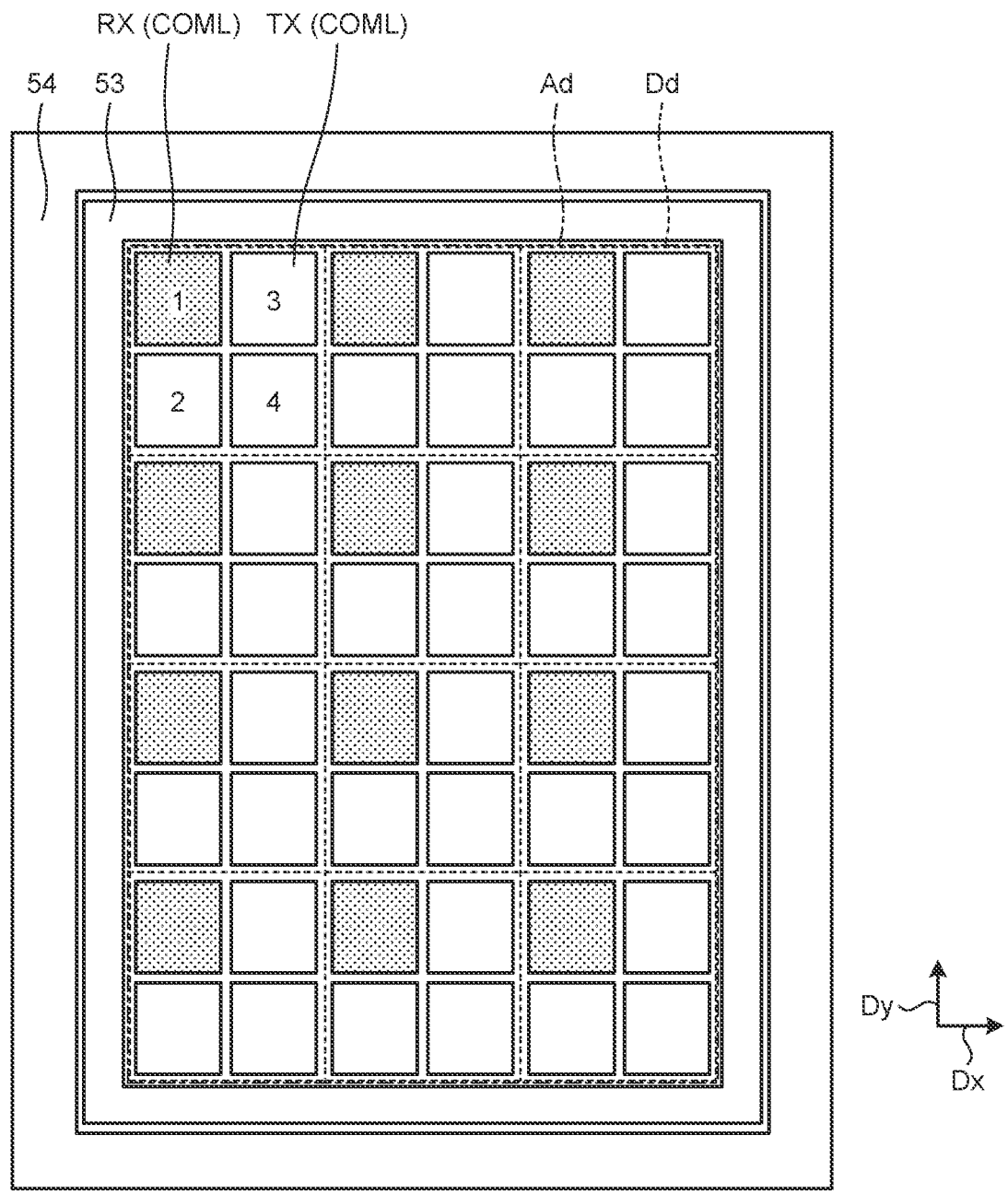
FIG. 24 is a schematic of the detection region and the peripheral region according to the third embodiment.
Figure 25:
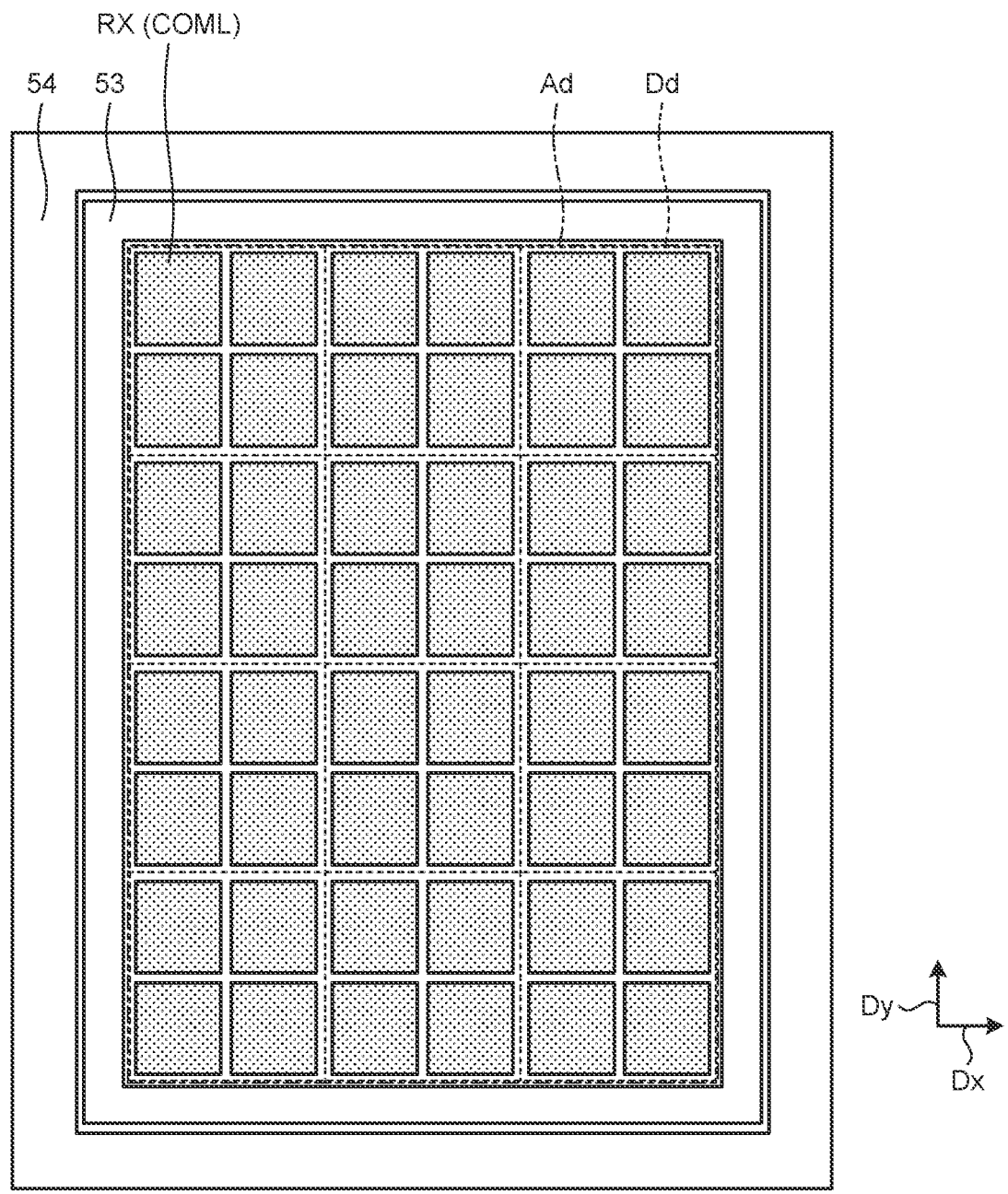
FIG. 25 is a schematic of the detection region and the peripheral region according to the third embodiment.
Figure 26:
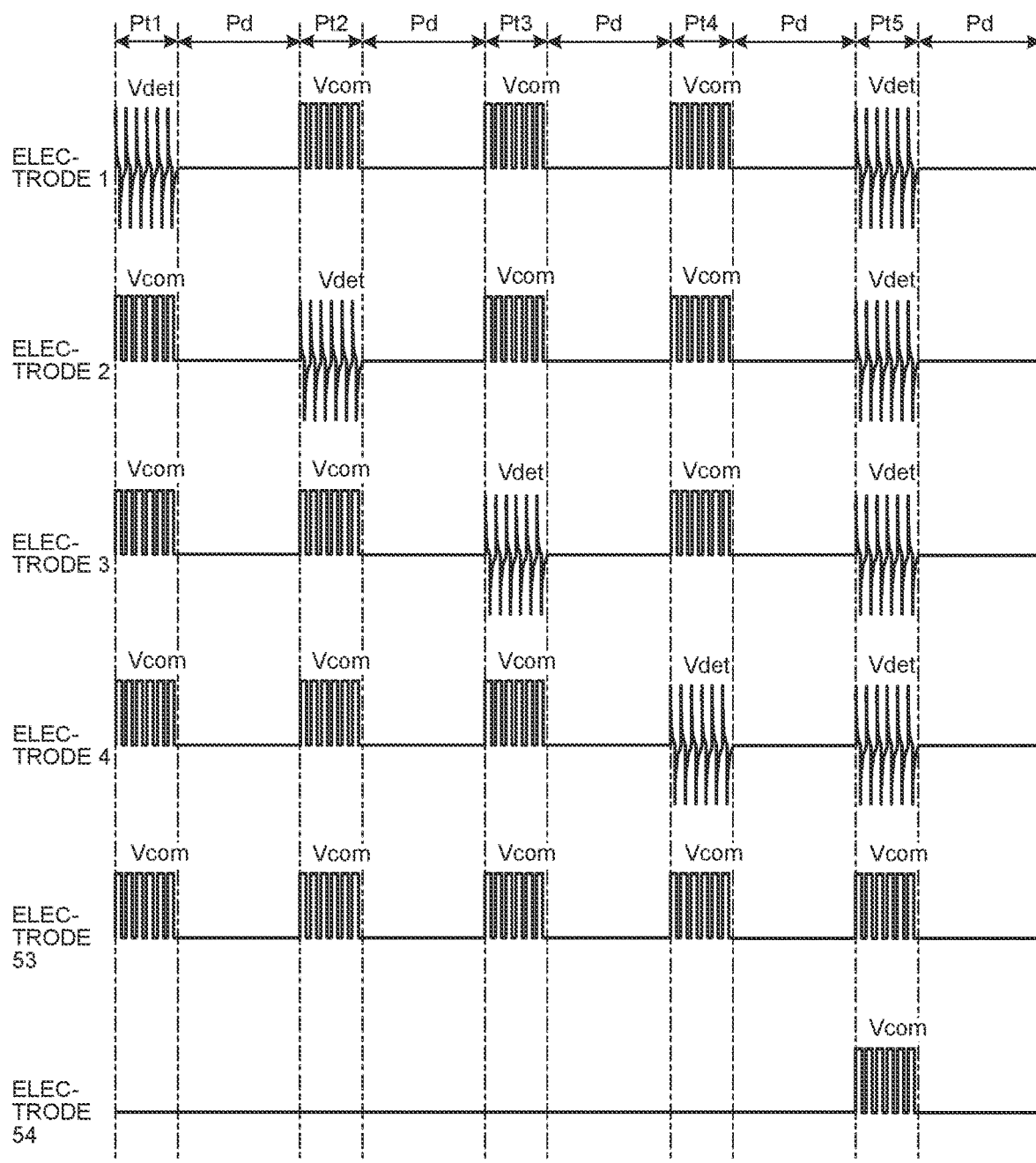
FIG. 26 is a timing chart of state transition of the electrodes according to the third embodiment.

FIGS. 24 and 25 are schematics of the detection region and the peripheral region according to the third embodiment. FIG. 26 is a timing chart of state transition of the electrodes according to the third embodiment.

As illustrated in FIG. 24, the divided regions Dd in the detection region Ad and the state transition of the electrodes 1, 2, 3, and 4 in the detection region Ad in the first detection periods Pt1, Pt2, Pt3, and Pt4 in the example illustrated in FIG. 26 are the same as those according to the first embodiment described with reference to FIGS. 7A to 7D and FIG. 10. The present embodiment couples the second electrode 53 to the electrode drive circuit 41 via a coupling circuit 17b in the first detection periods Pt1, Pt2, Pt3, and Pt4. The present embodiment selects the second electrode 53 as the drive electrode and supplies it with the detection drive signals VcomS. This aspect is the same as that described in the second embodiment with reference to FIG. 21.

As illustrated in FIG. 26, the present embodiment couples the second electrode 53 and the third electrode 54 to the electrode drive circuit 41 via the coupling circuit 17b in a second detection period Pe different from the first detection periods Pt1, Pt2, Pt3, and Pt4. The present embodiment selects the second electrode 53 and the third electrode 54 as the drive electrodes and supplies them with the detection drive signals VcomS. In the second detection period Pe, the present embodiment couples the electrodes 1 to 4 in the detection region Ad to the detection circuit 42 via the coupling circuit 17b. In other words, all the first electrodes COML in the detection region Ad serve as the detection electrodes.

As a result, the second electrode 53 and the third electrode 54 serving as the drive electrodes and supplied with the detection drive signals VcomS generate lines of electric force of a fringe electric field in the second detection period Pe. The lines of electric force can make the detection sensitivity to an external proximity object at the edges of the detection region Ad higher than that according to the second embodiment.

The aspect of the divided regions Dd in the detection region Ad in the first detection periods Pt1, Pt2, Pt3, and Pt4 may be the aspect according to the modifications of the first embodiment described with reference to FIGS. 13 to 17.

The second detection period Pe is not necessarily provided following the first detection periods Pt1, Pt2, Pt3, and Pt4. The second detection period Pe, for example, may be provided after a plurality of sets of the first detection periods Pt1, Pt2, Pt3, and Pt4.

The components according to the embodiments above can be appropriately combined. Out of other advantageous effects achieved by the aspects described in the embodiments, advantageous effects clearly defined by the description in the present specification or appropriately conceivable by those skilled in the art are naturally achieved by the present disclosure.

What is claimed is:

1. A detecting device comprising:
   a plurality of first electrodes arrayed in a first direction and a second direction intersecting the first direction in a detection region;
   a driver IC configured to supply a drive signal to the first electrodes and to detect a detection signal received from the first electrodes;
   a multiplexer configured to couple part of the first electrodes to the driver IC as a detection electrode and couple the first electrodes disposed side by side with the detection electrode in at least the first direction and the second direction to the driver IC as a drive electrode in a first detection period; and
   a second electrode surrounding the detection region, wherein
   the multiplexer switches the first electrode serving as the detection electrode in each of a plurality of the first detection periods,
   the multiplexer selects one of the first electrodes in a divided region obtained by dividing the detection region into a plurality of regions as the detection electrode and selects the others of the first electrodes as the drive electrode, and
   the multiplexer couples the second electrode to the driver IC as the drive electrode in the first detection period.

2. The detecting device according to claim 1, wherein the multiplexer defines a region surrounding four first electrodes composed of two pairs of first electrodes disposed side by side in the first direction and the second direction as the divided region.

3. The detecting device according to claim 1, wherein the multiplexer defines a region surrounding a plurality of first electrodes arrayed in the first direction as the divided region.

4. The detecting device according to claim 1, wherein the multiplexer defines a region surrounding a plurality of first electrodes arrayed in the second direction as the divided region.

5. The detecting device according to claim 1, further comprising
   a third electrode surrounding the second electrode, wherein
   the multiplexer couples the first electrodes to the driver IC as the detection electrode and couples the third electrode to the driver IC as the drive electrode in a second detection period different from the first detection period.

6. A display device comprising:
   a detecting device comprising:
      a plurality of first electrodes arrayed in a first direction and a second direction intersecting the first direction in a detection region;
      a driver IC configured to supply a drive signal to the first electrodes and to detect a detection signal received from the first electrodes; and
      a multiplexer configured to couple part of the first electrodes to the driver IC as a detection electrode and couple the first electrodes disposed side by side with the detection electrode in at least the first direction and the second direction to the driver IC as a drive electrode in a first detection period; and
   a plurality of pixels, wherein
   a display drive signal is supplied to the first electrodes in a display period for displaying an image by the pixels,
   the multiplexer switches the first electrode serving as the detection electrode in each of a plurality of the first detection periods, the multiplexer selects one of the first electrodes in a divided region obtained by dividing the detection region into a plurality of regions as the detection electrode and selects the others of the first electrodes as the drive electrode, the driver IC further comprises a second electrode surrounding the detection region, and the multiplexer couples the second electrode to the driver IC as the drive electrode in the first detection period.

7. The display device according to claim 6, wherein the multiplexer defines a region surrounding four first electrodes composed of two pairs of first electrodes disposed side by side in the first direction and the second direction as the divided region.

8. The display device according to claim 6, wherein the multiplexer defines a region surrounding a plurality of first electrodes arrayed in the first direction as the divided region.

9. The display device according to claim 6, wherein the multiplexer defines a region surrounding a plurality of first electrodes arrayed in the second direction as the divided region.

10. The display device according to claim 6, wherein the driver IC further comprises a third electrode surrounding the second electrode, and the multiplexer couples the first electrodes to the driver IC as the detection electrode and couples the third electrode to the driver IC as the drive electrode in a second detection period different from the first detection period.

* * * * *